(12) United States Patent
Preston

(10) Patent No.: US 9,648,225 B1
(45) Date of Patent: May 9, 2017

(54) METHOD, APPARATUS, SYSTEM AND SOFTWARE FOR FOCUSING A CAMERA

(71) Applicant: Howard Preston, Santa Monica, CA (US)

(72) Inventor: Howard Preston, Santa Monica, CA (US)

(*) Notice: Subject to any disclaimer, the term of this patent is extended or adjusted under 35 U.S.C. 154(b) by 0 days.

(21) Appl. No.: 15/150,932

(22) Filed: May 10, 2016

(51) Int. Cl.
*G03B 13/00* (2006.01)
*H04N 5/232* (2006.01)
*H04N 7/18* (2006.01)
*H04N 5/225* (2006.01)

(52) U.S. Cl.
CPC ....... *H04N 5/23212* (2013.01); *H04N 5/2257* (2013.01)

(58) Field of Classification Search
CPC combination set(s) only.
See application file for complete search history.

(56) References Cited

U.S. PATENT DOCUMENTS

| | | | |
|---|---|---|---|
| 6,160,607 A | 12/2000 | Diaconu | |
| 6,359,650 B1 | 3/2002 | Murakami | |
| 7,342,650 B2 | 3/2008 | Kern et al. | |
| 8,982,272 B1 | 3/2015 | Preston | |
| 2006/0158423 A1 | 7/2006 | Kern et al. | |
| 2006/0290932 A1 | 12/2006 | Kawanami | |
| 2012/0162375 A1 | 6/2012 | Vlutters et al. | |
| 2015/0341542 A1* | 11/2015 | Preston | G03B 13/20 348/346 |

FOREIGN PATENT DOCUMENTS

EP    WO 9963378 A1    12/1999

* cited by examiner

*Primary Examiner* — Lin Ye
*Assistant Examiner* — Euel Cowan
(74) *Attorney, Agent, or Firm* — Andrew D. Fortney; Central California IP Group, P.C.

(57) ABSTRACT

Methods, apparatuses, systems and software for focusing a camera are disclosed. The camera focusing system includes a distance measuring device, a video receiver that receives video/images, a graphics overlay unit, and a monitor. The distance measuring device includes an emitter that emits a radiation beam, a detector that detects reflected radiation, and logic that determines and processes distance information for subject(s) or object(s) in detection zones from the reflections. The graphics overlay unit receives video/image information from the video receiver and the distance information from the distance measuring device, and includes a video overlay and data processing unit that generates graphics indicating a field of detection and position for each detection zone and a direction and/or magnitude of a change in focus setting(s) to bring subjects or objects within each detection zone into focus. The monitor displays the video/image and the graphics overlaid thereon.

20 Claims, 13 Drawing Sheets

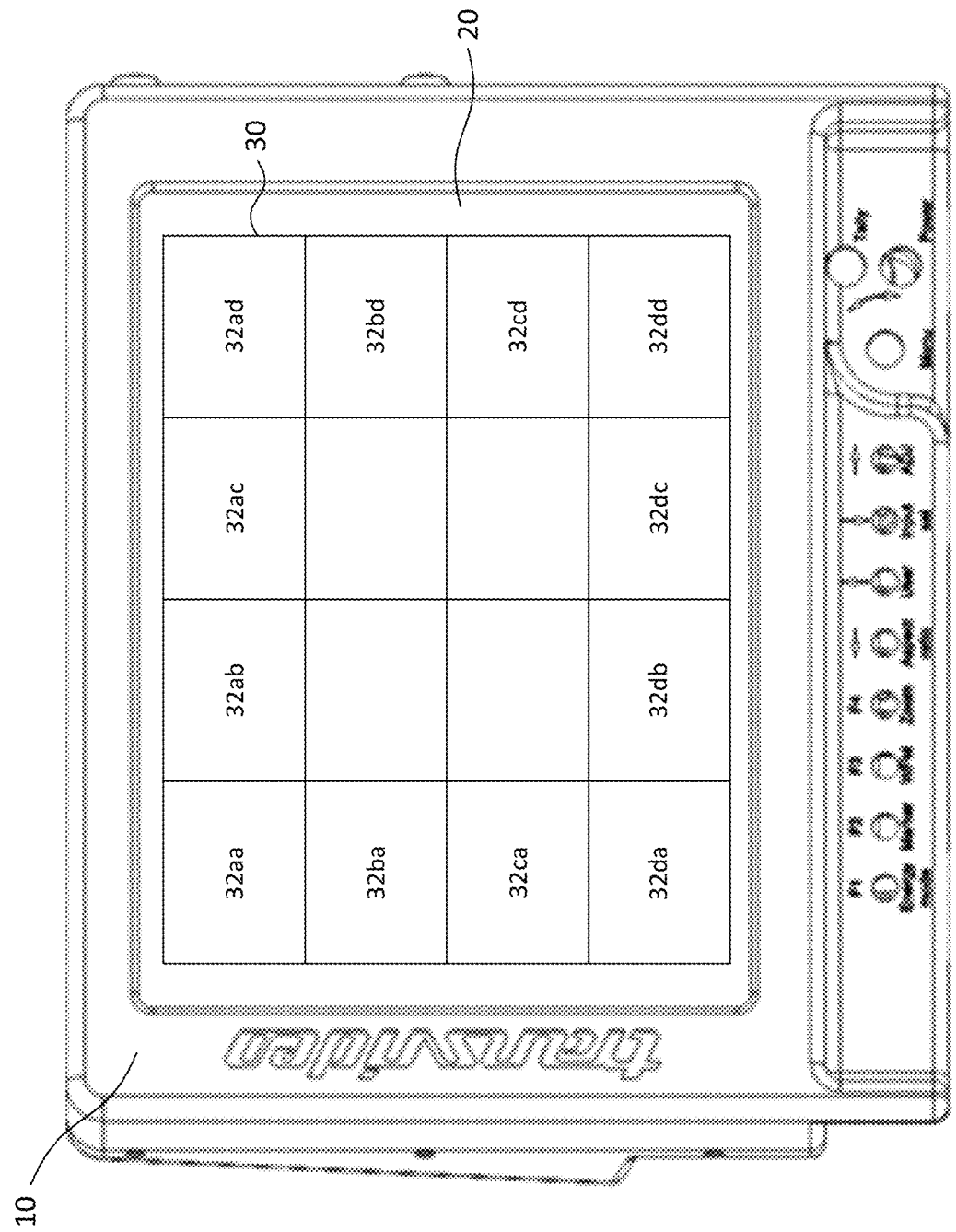

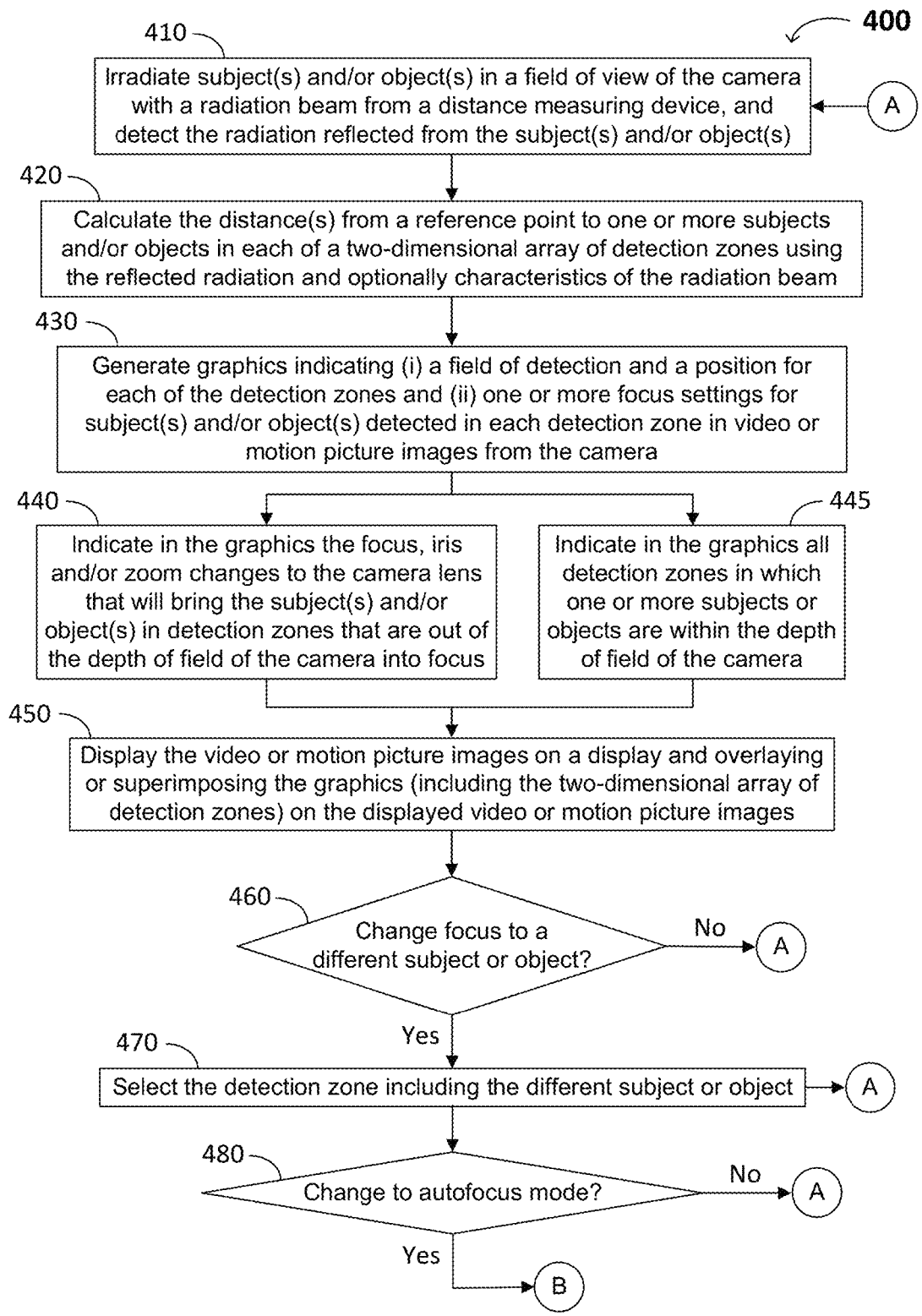

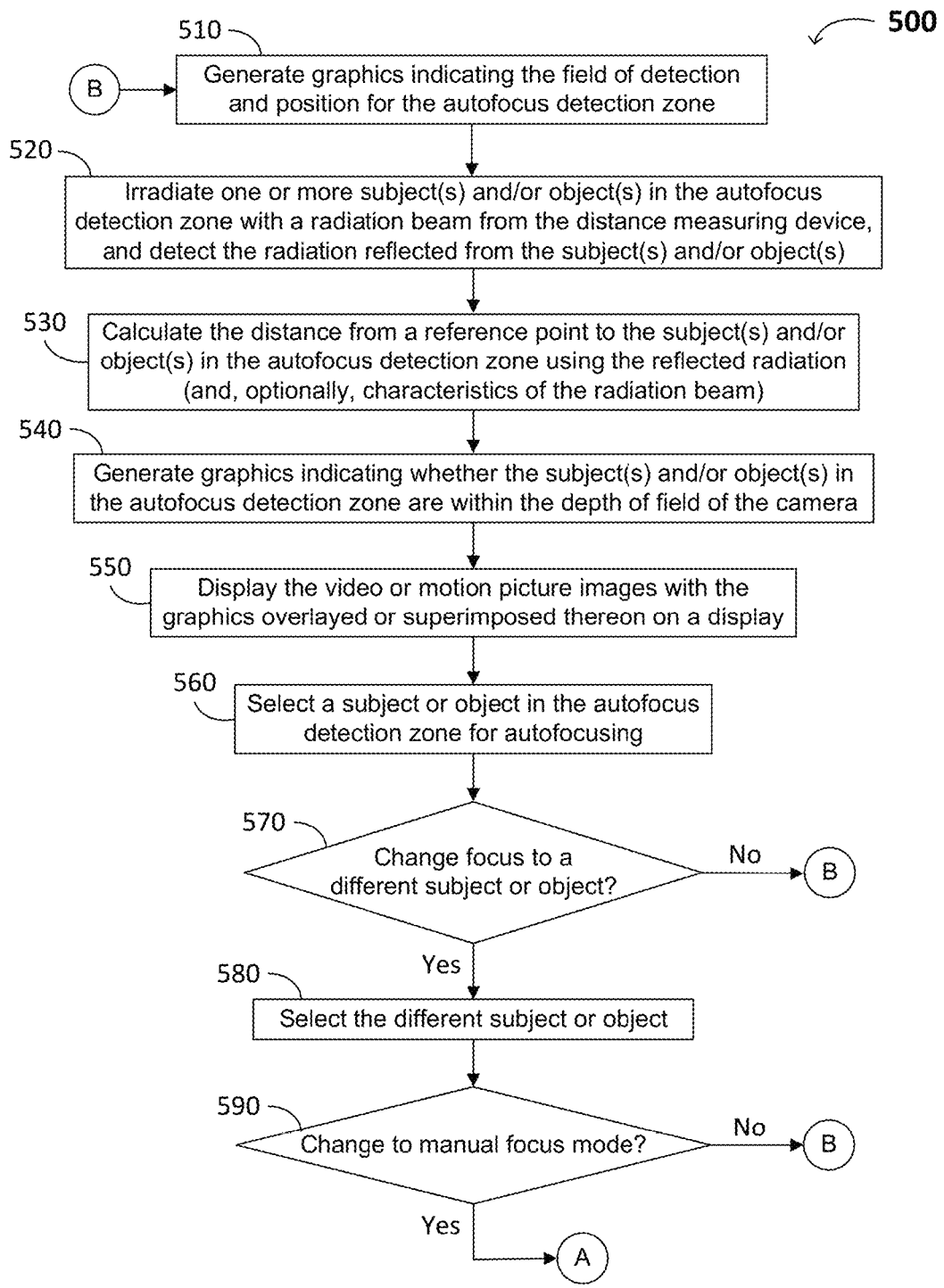

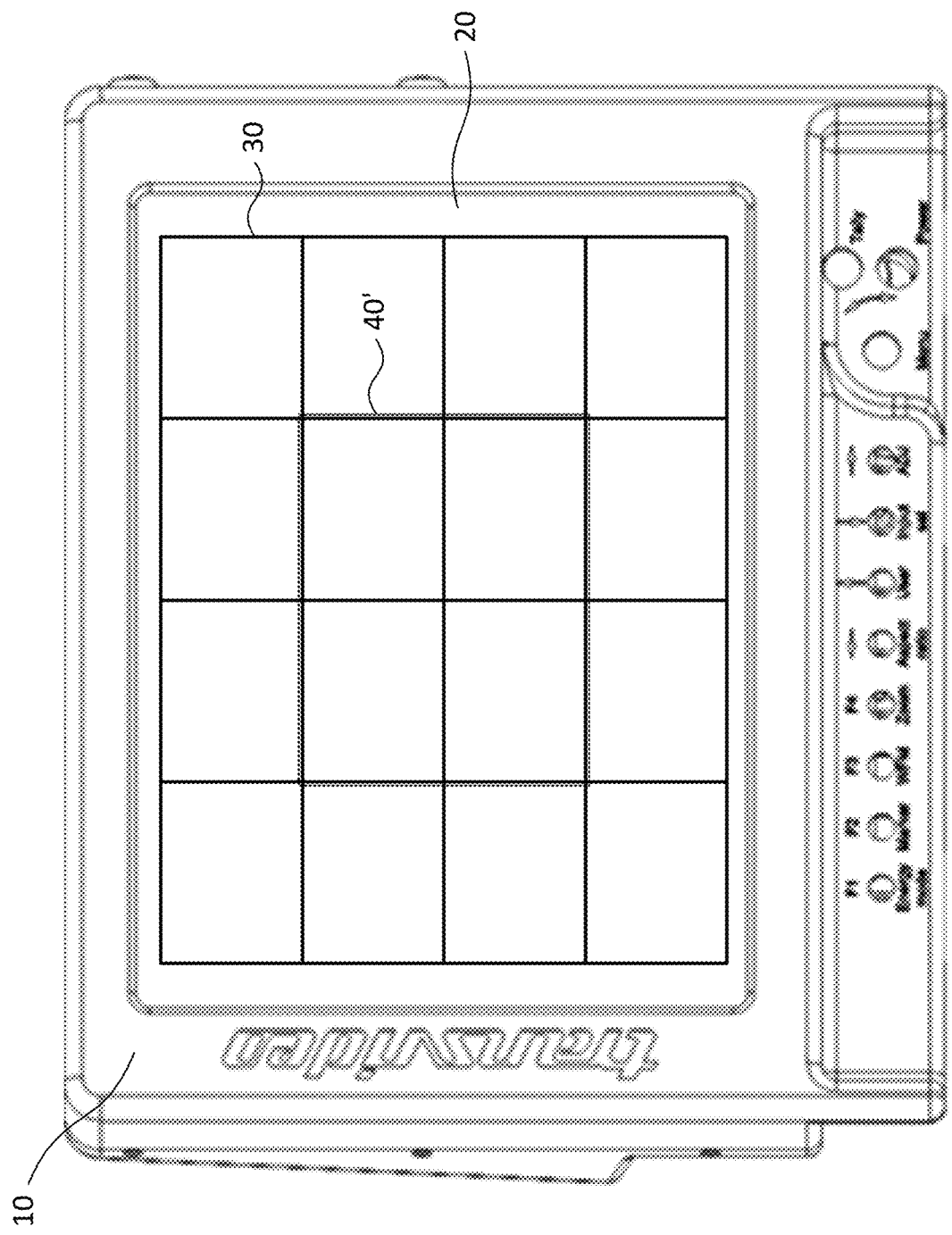

METHOD, APPARATUS, SYSTEM AND SOFTWARE FOR FOCUSING A CAMERA

RELATED APPLICATIONS

This application may be related to U.S. patent application Ser. No. 14/601,707, filed Jan. 21, 2015, pending, which is a continuation of U.S. patent application Ser. No. 14/286,479, filed May 23, 2014, now U.S. Pat. No. 8,982,272, the relevant portions of which are incorporated herein by reference.

FIELD OF THE INVENTION

The present invention generally relates to the field of focusing a cine-camera (e.g., a video, motion picture or cinematic camera). More specifically, embodiments of the present invention pertain to methods, apparatuses, systems and software for focusing a cine-camera.

DISCUSSION OF THE BACKGROUND

Conventionally, the focus of a motion picture camera lens is set manually to a distance where the plane of focus of the lens closely coincides with the location of a photographic subject. The camera lenses have focus distance calibrations that correspond to the distance from the image plane of the camera to the focus plane. Motion picture cameras may also have an electronic mechanism for delivering the focus distance setting through an electrical interface. The focus puller (e.g., a technician responsible for setting the focus of the camera lens) can adjust the camera lens to the subject distance by estimating the distance to a photographic subject and setting the focus distance of the lens to match the estimated distance, either directly or using electro-mechanical controls.

To estimate the focus setting for a static camera, the focus puller conventionally uses distance cues, such as reference marks made on the ground during rehearsal, or other objects whose known position relative to the camera can serve as distance references. Provided that the focus setting corresponds to the subject being within the depth of field of the lens (this depth being a specified range of distances in front of and/or behind the focus distance setting), the subject will appear acceptably sharp.

In many situations, the focus puller cannot achieve acceptably sharp focus using these conventional methods. For example, when the camera is moving during the process of shooting a scene, it is often not possible to use pre-set focus reference marks, as the path taken by the camera may not be predictable. In other situations, the depth of field of the lens is so shallow that the focus setting cannot be reliably estimated by the focus puller, even when reference marks are available.

In the situations described in the previous paragraph, the focus puller may use the image captured by the camera as displayed by a monitor to adjust the focus. However, the monitor can only show the degree to which the image appears to be in focus. If the image or subject is out of focus, the monitor cannot show the direction or the magnitude of any necessary focus setting change that will bring the subject coincident with the plane of focus, or within the depth of field of the lens.

There have been a number of challenges to focusing a camera (or image captured by the camera) using a video monitor. For example, once unclear or "buzzed" focus is observed, it is often too late to maintain or bring back focus, especially when subjects in the field of view of the camera are in motion. Sometimes it can be difficult to tell whether one must pull forward or backward to correct the focus. Peaking, or making the edges of objects within the image more visible (e.g., by increasing the contrast or color of the edges, or making the edges shimmer) does not provide much critical focusing information. Also, on many episodic TV series, there isn't sufficient room on set for the focus pullers, and they often work outside the set. On multiple camera shoots, there will be one monitor and one wireless focus unit for each camera and each assistant, thereby making demands for space for focus pullers even higher.

U.S. Pat. No. 8,982,272 ("US '272") describes a focus assistance system that uses graphics overlaid on the images in a video monitor to show to the focus puller both the direction and the amount that the focus setting of the camera lens must be changed to bring a subject in one or more of a plurality of detection zones into sharp focus. In addition, US '272 describes an autofocus function in which the user selects one or more detection zones, and the closest distance from a subject in the selected zone(s) to the camera image plane is used by the system to automatically focus the camera on the subject. In US '272, a distance measuring device (DMD) is mounted a distance from the entrance pupil of the camera shooting lens. As a result of this separation, the alignment of the overlay graphics with the corresponding areas of the video image must be shifted in both elevation and azimuth, with the magnitude of the shifts varying with the distance measured in each detection zone.

US '272 discloses alignment of the overlay graphics according to the focus distance set by the user and the separation between the DMD and the camera lens entrance pupil. Specifically, the video overlay and processing unit uses the known focus distance of the camera as measured from the image plane of the camera to shift the position of the overlay graphics in both the horizontal and vertical directions. Shifting the overlay graphics according to known focus setting(s) may have one or more disadvantages. First, the shift is generally valid only for subjects at the known focus setting(s), and the setting(s) are generally not known a priori. Furthermore, the camera image may show a plurality of subjects at different distances from the camera image plane, and a shift that is valid for one subject of interest may not be valid for another subject of interest. US '272 also discloses scaling the overlay graphics according to the angle of view of the camera lens, so that the detection zones are aligned with the image even as the camera field of view changes.

To react sufficiently quickly to the movement of subjects in the field of view, the focus puller must pay close attention to the camera images displayed on the video monitor. However, when the overlay graphics has a one-dimensional array of detection zones and the DMD is offset horizontally from the camera sensor or lens, the graphics (and more specifically, the position and/or size of one or more detection zones) can change as the zoom setting or focal distance changes. Thus, the focus puller or other viewer of the images on the video monitor may become distracted by shifts in the position of the overlay graphics relative to the images on the monitor, and their ability to choreograph the focus changes with changing subject distances may be adversely affected.

Additionally, the focus puller or other user may lose focus distance information resulting from parallax. When the DMD is offset vertically from the camera sensor or lens, parallax can result in difficulty obtaining accurate distance measurements in each of the detection zones when a subject or object is relatively close to the camera lens. This is believed to be due to the distance of the DMD from the entrance pupil becoming a significant fraction of the distance of the subject or object from the camera. For example, in the case where the DMD employs a one-dimensional detector array arranged in a horizontal row configuration, and the overlay graphics are offset according to the vertical parallax, the overlay graphics may be shifted beyond the bounds of the monitor image, resulting in the DMD not being able to provide distance information from an area of potential interest to the focus puller. In the case of horizontal parallax, the graphics will also shift horizontally, potentially causing the loss of distance information.

In camera focusing systems in which the angular size of the detection zones remains constant, the size of each detection zone (and in some cases, the number of displayed zones) changes as the focal length and the field of view of the camera lens changes. In particular, when the camera captures a large field of view, the number of detection zones may increase such that the graphics overlay depicting the detection zones obscures the camera image. In such systems, the maximum number of zones that can appear on the monitor may be the same as the number of detector elements (e.g., photodetectors or photodiodes) in the DMD.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a method, apparatus, system and software for focusing a camera (e.g., a cine-camera). The camera focusing system generally comprises a distance measuring device, a graphics overlay unit, and a monitor. The distance measuring device comprises an emitter configured to emit a beam of radiation, a detector configured to detect one or more reflections of the beam of radiation, and logic configured to determine distance information for one or more subjects or objects in each of a two-dimensional array of detection zones in a field of view of the camera from the reflections. In some embodiments, the distance measuring device may have a field of view that is substantially greater in size (i.e., height, width, or area) than that of the camera and camera focusing lens. The graphics overlay unit is configured to receive video or motion picture information from the camera and the distance information from the distance measuring device. The graphics overlay unit comprises a video overlay and processing unit configured to generate graphics indicating (1) a field of detection and position for each of the detection zones and (2) a direction and a magnitude of a change in focus setting(s) for the subject(s) or object(s) within each detection zone not within a depth of field of the camera. The field of detection and the position for each of the detection zones corresponds to a unique range of elevation angles and/or a unique range of azimuth angles from a predetermined reference point. The monitor is configured to display video or a motion picture from the cine-camera and the graphics overlaid on the displayed video or motion picture.

The two-dimensional array of detection zones may comprise a plurality of horizontal rows and a plurality of vertical columns. The number of horizontal rows may be the same as or different from the number of vertical columns. In one embodiment, the predetermined reference point is an entrance pupil of a focusing lens of the camera. Alternatively, the predetermined reference point may be an entrance pupil of the distance measuring device, a point or location in the image plane of the camera (e.g., the center of the camera image plane), or other fixed location from which measurements to subjects and/or objects in the field of view of the camera can be determined.

In various embodiments, the graphics indicate (i) each detection zone containing the subject(s) or object(s) within the depth of field of the camera and/or (ii) a relative position of the subject(s) or object(s) within the depth of field of the camera. In alternative or additional embodiments, the graphics indicate the direction and the magnitude of the change in the focus setting(s) that will achieve sharp focus on at least one of the subjects or objects in a selected detection zone. The graphics may further indicate a lens focal length, a T-stop setting, a camera type, a near depth of field distance, a far depth of field distance, and/or one or more image plane-to-subject distance measurements.

The graphics overlay unit may further comprise a communication unit configured to receive information from a motor control, data processing and/or communication unit on the camera that adjusts the focus, iris, and/or zoom settings and transmits lens setting data for the camera. The focusing system further comprising a zoom controller, a focus knob, and an iris control slider configured to control or adjust a zoom, focus or iris setting or parameter of the cine-camera. In one example, the zoom controller comprises a joystick that controls the rate or speed with which the camera changes the focus, iris and/or zoom setting or parameter.

Various embodiments of the present focusing system may further comprise a hand control unit including (i) a display that displays menu items for calibrating the camera and/or controlling focus, iris and/or zoom motors of the camera, (ii) a switch for selecting the menu items on the display, and/or (iii) one or more input keys for selecting displayed items or functions on the display. In one example, the hand control unit comprises a joystick configured to select one or more of the detection zones. Further embodiments of the present focusing system may further comprise a ring selector for selecting a focus distance, a witness mark that indicates the focus distance selected using the ring selector, and/or a focus knob.

In various embodiments, the distance measuring device further comprises circuitry configured to determine and process distance information for one of the one or more subjects or objects in a selected one or more of the detection zones, and/or the graphics overlay unit is further configured to indicate a field of detection and a position of an auto-focus detection zone. The position of the auto-focus detection zone corresponds to the selected one or more of the detection zones. In such embodiments, the camera may be configured to automatically focus on one (e.g., the nearest) subject or object in the auto-focus detection zone.

The present invention further relates to a camera system, comprising the present camera focusing system, the camera, a motor control unit, a video receiver and a display device configured to display the video or motion picture of the video or motion picture signal and the graphics overlaid on the video. The camera includes a lens and a video transmitter unit that transmits a video or motion picture signal, and may further include an image sensor configured to capture video and/or motion picture images and/or information. The motor control unit is generally configured to (i) adjust focus, iris and/or zoom settings of the camera and (ii) transmit lens setting data to the video overlay and processing unit. The video receiver is configured to receive the video or motion picture signal, and optionally transmit the same to the display device. For example, the display device may comprise a monitor.

In some embodiments, the motor control unit comprises a motor control, data processing and communication unit that adjusts the focus, iris, and zoom settings of the camera according to signals and/or information from and/or changes in a user hand control unit, and/or transmits lens setting data (e.g., through a wireless link) to the video overlay and processing unit. In further or alternative embodiments, the present camera system may further comprise a data processor configured to (i) determine an elevation angle and an azimuth angle for at least one of the subject(s) and object(s) in each of the detection zones and (ii) calculate the distances along an optical axis of the cine-camera from the image plane to the subject(s) and/or object(s) in each of the detection zones. The data processor may be may further configured to (i) correct the distances measured by the distance measuring device for an offset from the distance measuring device to a predetermined location in the image plane of the camera and/or (ii) calculate the distances along an optical axis of the camera from the image plane to the subject(s) and/or object(s). In some embodiments, the data processor is further configured to calculate a lens focus setting for the subject(s) and/or object(s) in one or more selected detection zones.

In the present camera system, the graphics include a two-dimensional array of detection zones. In one embodiment, the camera is a motion picture camera, and the motion picture camera may further comprise one or more motor encoder units configured to (i) mechanically change settings of the lens according to signals from the motor control and data processing unit and (ii) communicate motor positions to the motor control unit and/or the data processor. For example, the camera may include three motor encoder units, configured to separately control and/or mechanically change the focus, iris and zoom settings or positions of the lens.

The present invention further relates to software (such as a non-transitory computer-readable medium), comprising a set of instructions (e.g., encoded on the non-transitory computer-readable medium) adapted to generate graphics that assist in focusing a cine-camera, and overlay or superimpose the graphics on a displayed video or motion picture from the cine-camera. The graphics indicate a field of detection and a position for each of a two-dimensional array of detection zones of a distance measuring device, one or more focus settings for subject(s) and/or object(s) detected in each detection zone in the video or motion picture, and focus changes, adjustments or corrections to a lens of the cine-camera that will bring the subject(s) and/or object(s) in detection zones that are out of the depth of field of the cine-camera into focus. The field of detection and the position for each of the detection zones correspond to a unique range of elevation angles and/or a unique range of azimuth angles from a predetermined reference point.

The set of instructions may be further adapted to replace the graphics indicating the position(s) of the detection zones with a graphic indicating an auto-focus detection zone or add such an auto-focus zone graphic to the detection zone array graphics. The auto-focus detection zone may have a position corresponding to one or more of the detection zones. In such embodiments, the set of instructions may be further adapted to automatically focus the cine-camera on a selected subject or object in the auto-focus detection zone. In one embodiment, the auto-focus detection zone graphic and the detection zone array graphics are displayed simultaneously, the active (e.g., selected) graphic(s) is/are emphasized, and the inactive (e.g., non-selected) graphic(s) is/are de-emphasized. The software or computer-readable medium may further comprise one or more instructions adapted to (i) determine an elevation angle and an azimuth angle for at least one of the subject(s) and object(s) in each of the detection zones and/or (ii) calculate the distances along an optical axis of the cine-camera from the image plane to the at least one subject and/or object in each of the detection zones.

The present invention further relates to a method of focusing a cine-camera that uses the present camera focusing system and/or computer-readable medium to focus the cine-camera and/or that otherwise embodies one or more of the inventive concepts disclosed herein.

To avoid distracting the user by shifts or other changes in the position and/or size of the overlay graphics relative to the image on the monitor, the focusing system, cine-camera, software and method(s) described herein allow the graphics to remain fixed in location and size for a fixed field of view of the cine-camera, even as the distance between one or more subjects and the image plane of the camera changes. In other words, the present invention allows the overlay graphics displayed on the images in the video monitor to remain static, despite varying amounts of parallax due to the separation between the distance measuring device and the image plane of the camera, and despite the different distances between various subjects and/or objects in the field of view and the camera image plane. However, the size of the detection zones may be changed with a change in the field of view of the camera, for example to limit the number of detection zones in the case of a large field of view. The overlay graphics represent the direction and magnitude of the corrections to the lens focus setting(s) that will focus the camera on a selected subject in any one or more of a two-dimensional array of detection zones.

An additional advantage of the present focusing system and method(s) is that the user avoids losing focus distance information from the monitor image resulting from parallax. That is, the present invention allows the overlay graphics (which represent the area of the image in which the camera focusing system can manually or automatically focus the camera lens) to remain static, despite varying amounts of parallax due to (1) the separation between the distance measuring device and the image plane of the camera, and (2) the different distances between the selected subject(s) and the camera image plane. Thus, the present invention allows the overlay graphics (which includes a two-dimensional array of detection zones) to remain static for a wide range of focal lengths of the camera lens.

The distance measuring device may include or incorporate a two-dimensional array of sensors or detectors, the array having a horizontal angle of detection and/or a vertical angle of detection (and preferably, both) substantially greater than the angle of view of the camera, as measured on the camera image sensor. The array of sensors or detectors in the distance measuring device corresponds to the two-dimensional array of detection zones in the overlay graphics. Each of the detection zones is defined at least in part by a range of horizontal and/or vertical angles (e.g., one or more ranges of angular coordinates). When the size and/or position of the detection zones is defined or determined by angular coordinates relative to a fixed reference point, the size and position of the detection zones remains fixed for a fixed field of view of the cine-camera.

The present invention also allows the size and shape of the detection zones to be altered, changed or modified by the user. The present invention (and in particular, the overlay graphics) make it possible for the user to switch between manual and autofocus modes smoothly. The present invention advantageously provides a method for the user to accurately focus the shooting or focusing lens of a motion picture or other cine-camera by observing the graphics overlaid on the images captured by the cine-camera. The overlay graphics can indicate both the direction and magnitude of distances, as measured along the optical axis of the camera lens, between the plane of focus of the camera lens (or other reference point) and a plethora of subjects within a two-dimensional array of detection zones within the detection field of the distance measuring device.

The components in the focusable cine-camera system may include a cine-camera, the distance measuring device, a lens readout device, a motor drive/data processing/communication unit, a display overlay and/or data processing device, and a video or motion picture display device. The images may be captured or recorded in the camera on an electronic image sensor, photographic film, or other medium. The live image can be made available by the cine-camera as an electrical signal that can be displayed on a monitor. The monitor may be integrated into the camera and/or be in a separate, stand-alone device. The distance measuring device measures distances as well as elevation and azimuth angles from a reference point to a plurality of targets using a two-dimensional array of light- or photosensors, or a light- or photosensor having a two-dimensional array of light- or photosensing blocks or zones. The lens readout device generates one or more signals indicating the focus distance setting, the f-stop, and in the case of a zoom lens, the focal length setting. The motor drive, data processing, and communication unit remotely adjusts the lens iris and the camera focus and zoom functions, and reports the lens settings (e.g., through a wireless link) to a remote processor and/or control unit. The display overlay and data processing device overlays the graphics and optional text onto a live video stream (e.g., as captured by the cine-camera). It can also calculate the lens depth of field, and encode the overlay graphics to reflect the direction and magnitude of the changes in lens focus settings to bring one or more subjects and/or objects in the detection zone or field into sharp focus.

The present invention advantageously provides a focusing device that allows a user to focus the lens of a motion picture or other cine-camera on one or more subjects simultaneously or substantially simultaneously by overlaying graphics on or over the video or motion picture images captured by the camera. The graphics indicate the direction and magnitude of the corrections to the present lens focus setting that will focus the camera on selected subject(s) or object(s) in the images. The graphics indicate the positions of a two-dimensional array of detection zones relative to the images captured by the camera. The graphics can indicate which subjects are within the depth of field of the camera lens, the relative position of the subjects within the depth of field of the camera lens, which of the subjects are outside of the depth of field of the lens at its current focus setting, and the magnitude and direction of corrections in the focus settings that will place the subjects within the depth of field of the camera lens.

The present invention also advantageously provides a device or apparatus that comprises a measuring device that measures each of a plurality of distances from itself to each of a plurality of subjects in a field of view of a camera (e.g., within multiple detection zones arrayed vertically and horizontally in the field of view) simultaneously or substantially simultaneously; a data processing device that can correct the distances measured by the distance measuring device for the offset from itself to the center of the camera image plane or other reference point, and can calculate the distances along the optical axis of the camera lens from the image plane/reference point to the plurality of subjects, and thereby calculate the lens focus setting for each of the plurality of subjects; and a video overlay, data processing, and communication unit that generates graphics indicating the horizontal and vertical field of detection and position for each detection zone (and/or each subject or object of interest in each such detection field) of the distance measuring device, and that can determine and display the lens focus settings for the subjects detected in the detection field and/or each detection zone according to information provided by the data processing device.

The two-dimensional detection array in the distance measuring device allows the size and position of the detection zones that appear on the graphics overlay to remain constant for a fixed angle of view of the camera lens, independent of the parallax induced by changes in subject distance. Thus, the detection zones remain aligned with the subjects even as the distances separating the subjects from the camera image changes. However, the present cine-camera focusing system also allows the user to combine or split detection zones to change their number and/or size. For example, by combining distance data from two or more detector array elements (e.g., photosensors) in the distance measuring device, the resultant detection zones will have larger azimuth and/or elevation angles of detection, and the number of detection zones appearing on the graphic overlay can be constrained to reduce or minimize obscuring the images from the cine-camera. These and other advantages of the present invention will become readily apparent from the detailed description of various embodiments below.

BRIEF DESCRIPTION OF THE DRAWINGS

FIGS. 1A-C show exemplary graphics including a two-dimensional array of detection zones displayed on a monitor according to embodiments of the present invention.

FIGS. 8A-B are flow charts showing exemplary methods of focusing a motion picture or other cine-camera on one or more subjects within the detection zone(s) of the distance measuring device according to embodiments of the present invention.

FIGS. 9A-B show exemplary graphics for indicating active and inactive focusing modes according to one or more embodiments of the present invention.

DETAILED DESCRIPTION

Figure 1B:
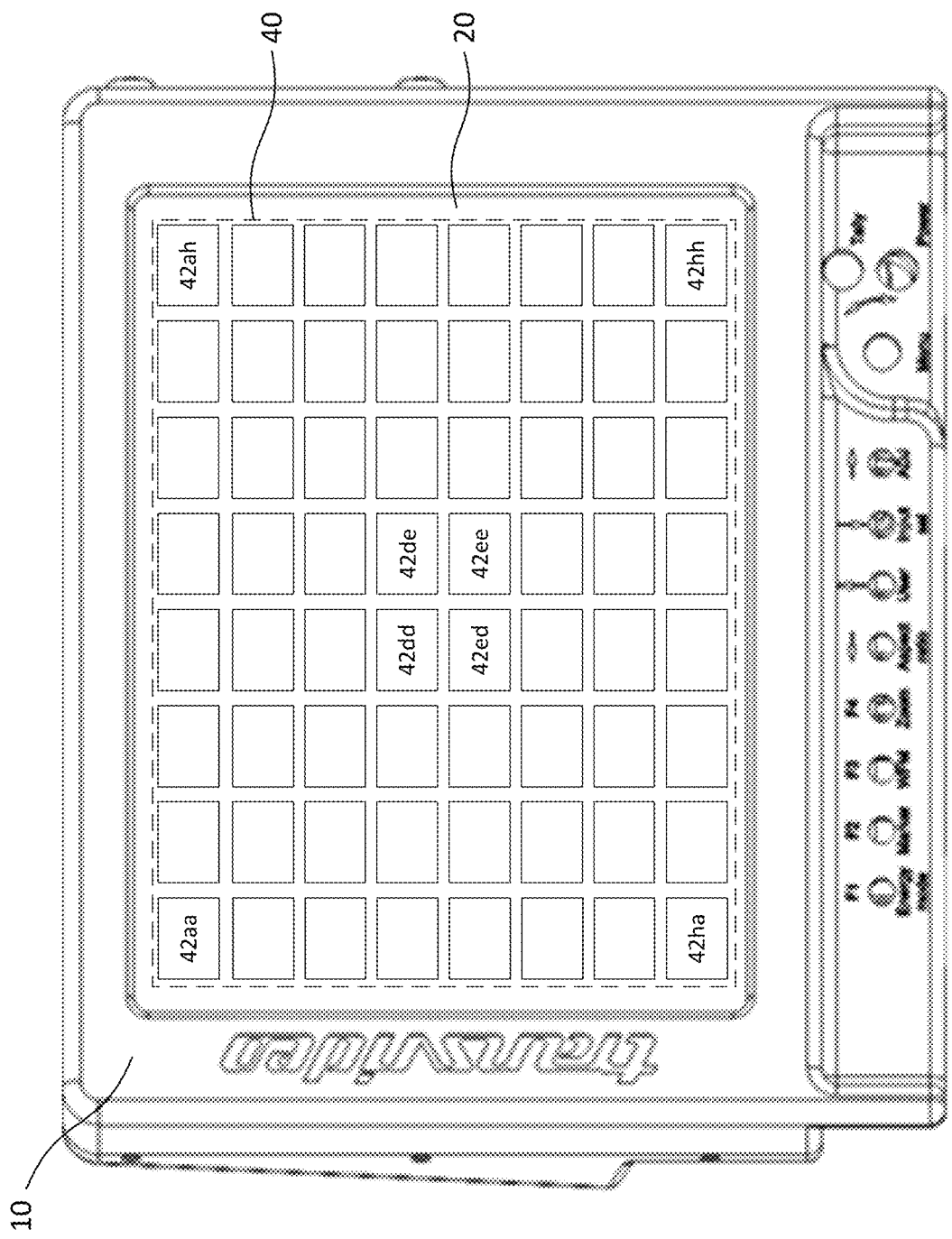

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the present invention.

The present invention provides an apparatus and method that can indicate simultaneously or substantially simultaneously the focus status of multiple subjects in a two-dimensional array of detection zones in an image or image stream from a camera and shooting lens, where the focus status can indicate both the direction and the distance, as measured along the optical axis of the camera and lens, of the subjects from the plane of focus of the shooting lens (or other reference point). The focus status is shown in a display, and may be indicated by graphical elements overlaid on the images captured by the camera. The graphical elements indicate the magnitude and direction of the change in lens focus setting(s) that will bring one or more of the subjects and/or objects in the field of view of the camera into sharp focus (e.g., a focus setting such that no further or additional detail can be gained in the desired or selected subjects and/or objects as captured by the camera by any further or additional change in the focus setting). The invention thereby allows the user to simultaneously view the images captured by the camera, automatically change the focus setting of the camera (or manually control the rate of change in the focus setting of the camera lens in accordance with the artistic requirements of the photography), and achieve high accuracy in focusing the lens on one or more subjects in the field of view of the camera.

By defining the position and size of the detection zones using angular coordinates (e.g., elevation and azimuth angles), the size and position of each detection zone remains fixed for a fixed field of view of the camera, regardless of the distance of the subject(s) and/or object(s) in the field of view from the camera lens. As a result, the focus puller or other user of the present focusing system is not distracted by changes in the size or position of the detection zones. The use of a two-dimensional array of detection zones enables the user to use a greater amount of the camera field of view to focus on different subjects and/or objects that may be spread out over a greater proportion of the camera field of view, and gives the user greater flexibility in defining the detection zones, relative to a similar camera focusing system and method that have only a one-dimensional array of detection zones.

Furthermore, the size and/or number of the detection zones may be changed with a change in the field of view of the camera, for example to reduce the number of detection zones in the case of a large field of view. In one embodiment (e.g., when the field of view of the camera changes), the number of detection zones may change automatically as a function of the focal length of the camera/lens. For example, the number of detection zones may decrease automatically as the focal length of the camera or lens exceeds a first predetermined focal length, and increase automatically as the focal length of the camera or lens decreases below the first predetermined focal length. This concept can be extended to additional focal lengths for automatically changing the number and/or size of the detection zones, depending on the field of view of the camera.

The invention disclosed herein gives the user clear visual prompts in the form of graphics that show both the direction and magnitude that will bring the lens focus setting to the position of a particular subject in the field of view of the camera. The graphics shown on the display allow the user to concentrate on adjusting the focus settings in accordance with the movement of the photographic subjects, rather than estimating the focus distance to the subject.

The invention concerns a distance measuring and/or focusing device that allows the user to focus the lens of a cine-camera (e.g., a video or motion picture camera) on one or more subjects simultaneously or substantially simultaneously by overlaying graphics on or over the images captured by the cine-camera, the graphics indicating the direction and/or magnitude of the corrections to the present lens focus setting that will achieve a sharp focus on a selected subject (e.g., within a selected detection zone). The graphics indicate the positions of a two-dimensional array of detection zones relative to the image(s) captured by the cine-camera. The graphics may also indicate subjects that are within the depth of field of the camera lens or the relative position of the subjects within the depth of field of the camera lens, and/or which of the subjects are outside of the depth of field of the lens at its current focus setting. In a further embodiment, the graphics can indicate or display the magnitude and/or direction of corrections in the focus settings that will place the subjects within the depth of field of the camera lens. The detection zones of the distance measuring device may be arranged in an array of rows and columns.

The invention also concerns a focusable cine-camera system that comprises a distance measuring device that simultaneously measures the distance from itself to a plurality of subjects in each of a two-dimensional array of detection zones of the field of view of a camera; a data processing device that corrects the distances measured by the distance measuring device for the offset from itself to the center of the camera image plane or other reference point, and that in a further embodiment, calculates the distances along the camera lens optical axis from the reference point to a plurality of subjects or objects, thereby calculating the lens focus setting for the plurality of subjects; a video overlay, data processing and communication unit that generates graphics that indicate the horizontal field of detection and the position of each detection zone of the distance measuring device, as well as one or more lens focus settings for the subjects or objects detected within each detection zone or group of detection zones (and in which the zone or group of zones may be selected by the user); a motor control, data processing and communication unit that adjusts the focus, iris, and zoom settings (e.g., according to a user hand control unit) and transmits lens setting data (e.g., through a wireless link) to the video overlay, data processing and communication unit; one or more motor/encoder units configured to mechanically change the settings of the camera lens according to one or more signals from the motor control, data processing and communication unit, and optionally, communicate the motor positions to the motor control unit; and a cine-camera with a lens, the cine-camera having a video or motion picture signal output. The cine-camera may further comprise a video transmitter unit, and the system may further comprise a video receiver (e.g., that receives the output of the video transmitter unit). In one embodiment, the video transmitter unit and the video receiver communicate wirelessly. The system also generally comprises a display device, which may be stand-alone or integrated with the cine-camera or the distance measuring device, on which the graphics are displayed, and that the user (e.g., a focus puller) can view and interact with.

The invention, in its various aspects, will be explained in greater detail below with regard to exemplary embodiments.

An Exemplary Camera Focusing System and Exemplary Graphics for the Same

FIG. 1A shows an exemplary monitor 10 for a video processing unit (see, e.g., FIG. 6) having a display screen 20. The video processing unit further includes a graphics overlay unit (not shown in FIG. 1A) that receives the video or motion picture signal from the cine-camera and overlays a two-dimensional array 30 of detection zones 32*aa*-32*dd* onto the images displayed on the display screen 20. The array 30 of detection zones includes a plurality of horizontal rows and a plurality of vertical columns. The number of rows is at least 2 (e.g., 2, 3, 4, 5, 6, 8, 10, 12, 16, etc.), and the number of columns is independently at least 2 (e.g., 2, 3, 4, 5, 6, 8, 10, 12, 16, etc.). The number of rows may be the same as the number of columns, but is not necessarily the same. The present camera focusing system is configured to determine a distance of one or more subjects or objects in each of the detection zones 32*aa*-32*dd* from a reference point (e.g., the entrance pupil of a lens of the cine-camera; see, e.g., FIG. 2).

One advantage of the present graphics is that the size and position of each detection zone 32*aa*-32*dd* does not change, regardless of the focus distance of the cine-camera. This is a result of defining the size and position of the detection zones 32*aa*-32*dd* using angular coordinates (e.g., coordinates based on elevation angles and azimuth angles). For example, the uppermost row of detection zones 32*aa*-32*ad* may be defined at least in part by a first range of elevation angles $\Phi_1$-$\Phi_2$, a next row of detection zones 32*ba*-32*bd* may be defined at least in part by a second range of elevation angles $\Phi_3$-$\Phi_4$, a third row of detection zones 32*ca*-32*cd* may be defined at least in part by a third range of elevation angles $\Phi_5$-$\Phi_6$, etc. Similarly, the leftmost column of detection zones 32*aa*-32*da* may be defined at least in part by a first range of azimuth angles $\theta_1$-$\theta_2$, a next column of detection zones 32*ab*-32*db* may be defined at least in part by a second range of azimuth angles $\theta_3$-$\theta_4$, a third column of detection zones 32*ac*-32*dc* may be defined at least in part by a third range of azimuth angles $\theta_5$-$\theta_6$, etc. The various ranges of elevation angles and azimuth angles do not overlap, although the endpoints of adjacent ranges may be equal.

FIG. 1B shows an alternative embodiment in which the two-dimensional array 40 includes 64 detection zones 42*aa*-42*hh*. In the embodiment of FIG. 1B, the elevation angles and azimuth angles of adjacent ranges do not overlap at all (i.e., there is a difference between the closest angles of adjacent ranges). When the size and position of each detection zone 42*aa*-42*hh* is based on angular coordinates, the peripheral detection zones (i.e., those in the outermost rows and columns, such as 42*aa*-42*ah*, 42*aa*-42*ha*, 42*ah*-42*hh*, and 42*ha*-42*hh*) may be slightly larger than the central detection zones (i.e., those closest to the center of the field of view, such as 42*dd*, 42*de*, 42*ed*, and 42*ee*), depending on the horizontal and/or vertical angle(s) of view of the camera. Therefore, the size of the detection zones in a given array may vary slightly, depending on the amount of parallax among the detection zones.

For example, when the horizontal field or angle of view is ±8° and the two-dimensional array of detection zones has 16 rows and 16 columns, the peripheral detection zones have a size or area of just over 1% greater than those of the central detection zones, so the difference in sizes or areas can be neglected. On the other hand, when the camera has a horizontal field or angle of view of ±15°, the peripheral detection zones in the same array have a size or area of 3.7% greater than those of the central detection zones. This difference may be noticeable. If the user desires uniform detection zone dimensions, a look-up table may be created that contains the scale factors for each detection zone using known angles of detection (e.g., elevation and azimuth angle ranges) for the array.

In some embodiments, it is also possible for the user to select a horizontal row of detection zones which are not centered vertically on the video monitor (e.g., row 42*ba*-42*bh*) for further processing or to obtain further information. For example, crop marks (e.g., "[ ]") may be displayed the video image to the left and right of the selected row to indicate the corresponding range of elevation angles of detection.

In further embodiments, one or more horizontal rows of detection zones can be replaced with "bar graph" detection zones (e.g., as disclosed in U.S. Pat. No. 8,982,272, the relevant portions of which are incorporated herein by reference). In one embodiment, the detection zones in a selected row in the array may have a bar at the top or bottom that indicates the distance and direction that a subject or object in the zone is from the plane of focus of the camera (see, e.g., FIG. 5 of U.S. Pat. No. 8,982,272). The zone color may change (e.g., from white to green) when a subject in the zone is within the depth of field of the camera lens. In one example, zones or bars above a median line in the selected row may indicate that a subject or object in the corresponding detection zone is behind the plane of focus of the camera, while zones or bars below the median line may indicate that a subject or object in the corresponding detection zone is in front of the plane of focus of the camera. Bars or zones having a different color (e.g., green) may depict zones in which a subject or object therein is in focus, and thus such zones may automatically show the depth of field, calculated by lens focal length, distance and T-stop.

Figure 1C:
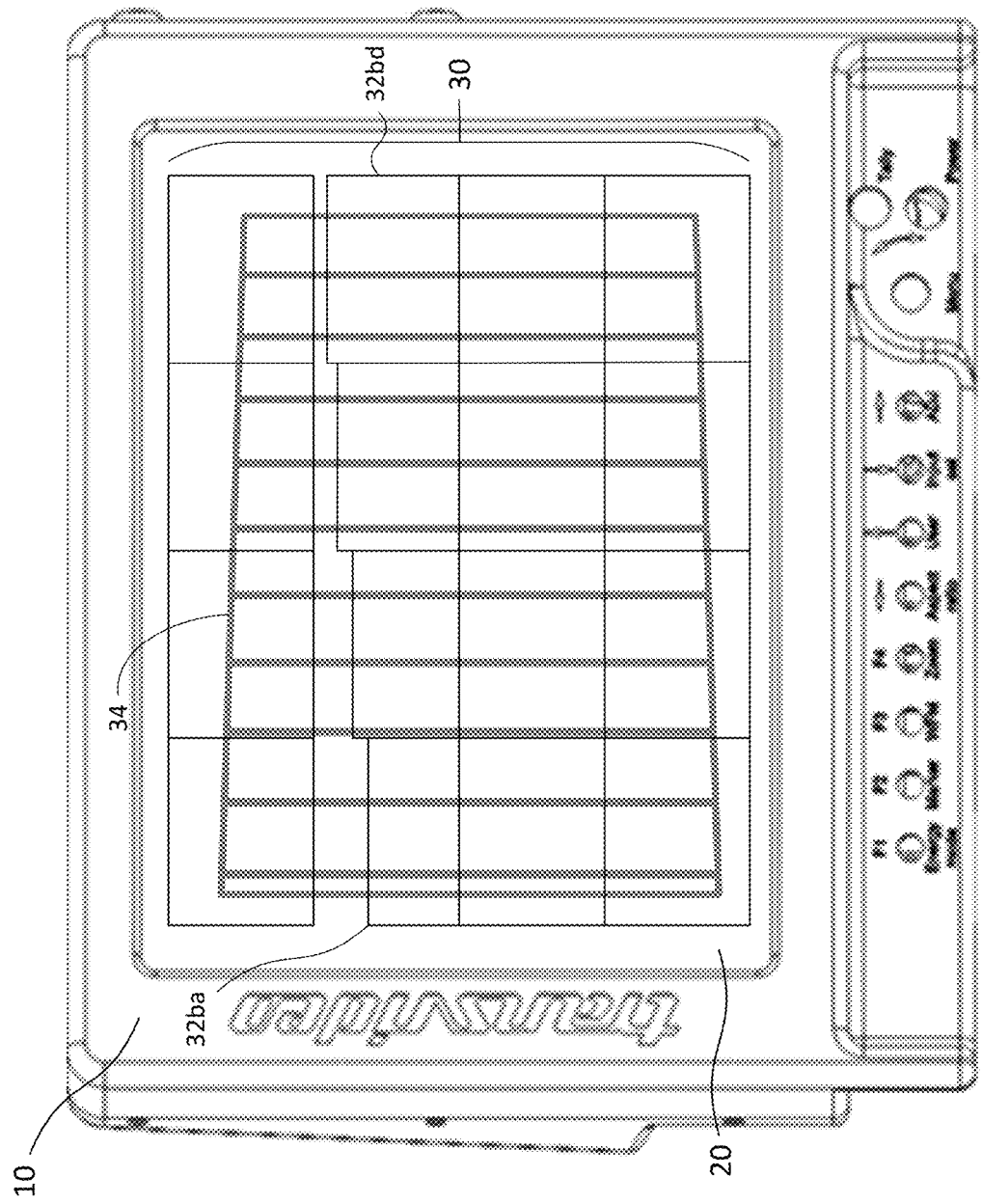

Alternatively, as shown in FIG. 1C, the height of the detection zones in a selected row may correspond to the distance measurement for the nearest subject or object in each detection zone (e.g., the farther away the subject or object in the detection zone is, the taller the detection zone is). In the example of FIG. 1C, the row of detection zones 32*ba*-32*bd* is selected as the row in the array 30 to be the "bar graph" row. An object 34 (e.g., a fence or wall) is in each detection zone 32*ba*-32*bd*, but the portion of the object 34 in each detection zone 32*ba*-32*bd* is a different distance away from the camera focus plane. The portion of the object 34 in detection zone 32*bd* is farther away from the camera lens than the portion of the object 34 in detection zone 32*ba*, so the detection zone 32*bd* is taller than detection zone 32*ba*. This example is very useful for a relatively simple distance ranging mode, when distance and/or focus information is to be obtained quickly, or when a user cannot run a focus tape. A row of "bar graph" detection zones may be designated by crop marks to the left and right of the row.

Figure 2:
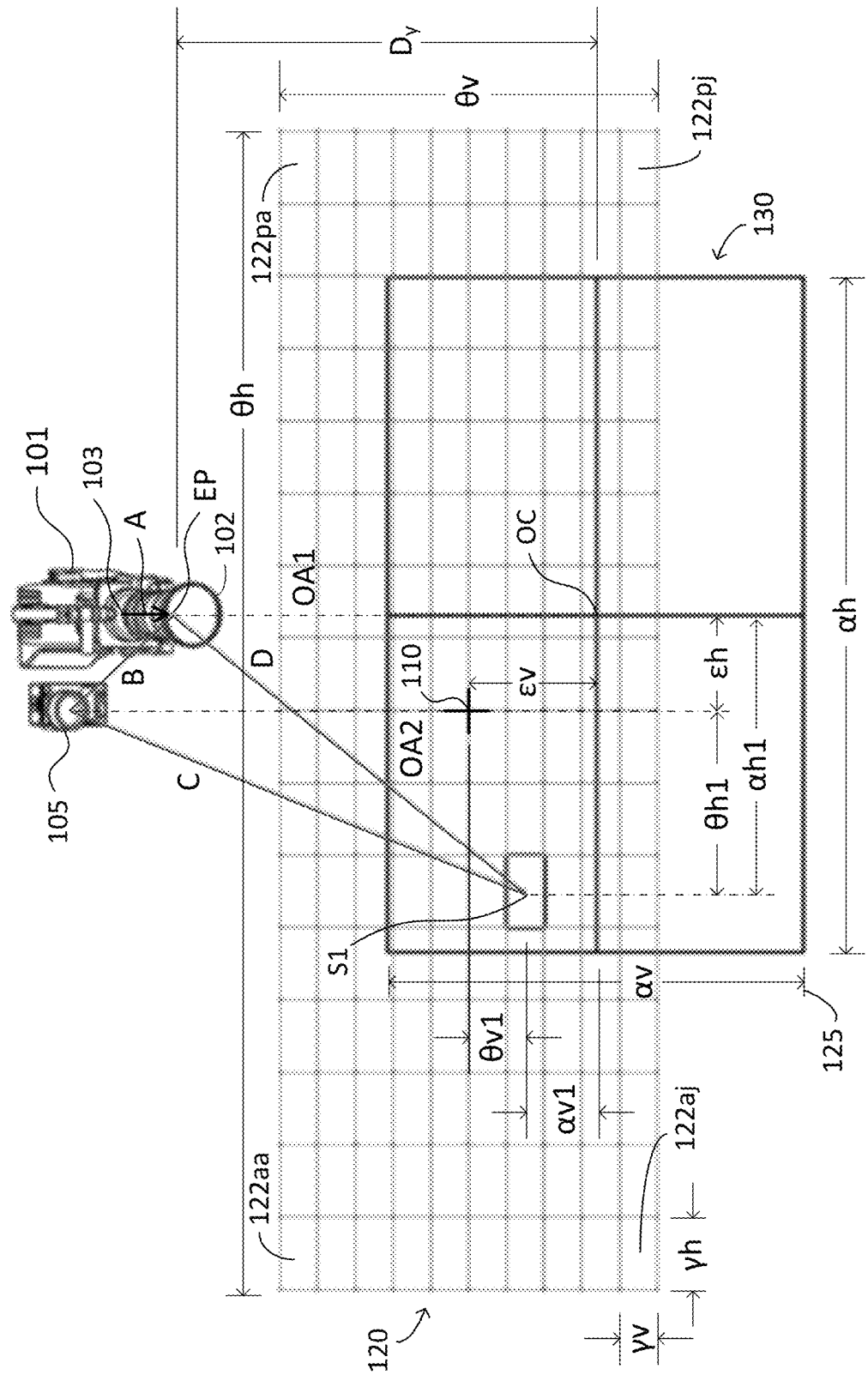
FIG. 2 shows an exemplary cine-camera and distance measuring device that determines a distance to a subject using a two-dimensional array of detection zones according to one or more embodiments of the present invention.

An Exemplary Distance Measuring System and an Exemplary Camera System Including the Same FIG. 2 shows a distance measuring device (DMD) 105 and a cine-camera (e.g., motion picture camera) 101 configured to implement the present invention. The DMD 105 may include or incorporate a two-dimensional sensor array having horizontal and vertical angles of detection substantially greater than the angle of view of the camera 101, as measured on the camera image sensor 103. The two-dimensional sensor array of the DMD 105 corresponds to the two-dimensional array of detection zones (e.g., arrays 30 and 40 shown in FIGS. 1A-B).

According to FIG. 2, the lens focus setting for a calibration subject S1 is |A|+Dy. The vector A is assumed to be parallel to the y-axis of an array 120 of tiles or blocks 122*aa*-122*pj* and collinear with a y-axis OA1 centered on the camera image sensor 103 (see also the Y axis extending from the image sensor 220 in FIG. 4). The array 120 of tiles or blocks 122*aa*-122*pj* represents a two-dimensional plane corresponding to the detection zones of the DMD 105 at a given distance Dy from the entrance pupil EP of the camera lens 102. The locations of the tiles or blocks 122*aa*-122*pj* are defined by angular coordinates (or, alternatively, a combination of angular and Cartesian coordinates) relative to a predetermined reference point (in this case, the entrance pupil EP). The vector B represents the offset of the center of the detector array of the DMD 105 from the entrance pupil EP of the camera lens 102. Also according to FIG. 2, the vectors A, B, C, and D are related by the following equation [1]:

$$B+C=A+D \qquad [1]$$

The focus setting of the lens 102 is |A|+Dy, which is equal to By+Cy.

FIG. 2 shows the DMD 105 in an embodiment with 160 detection zones 122*aa*-122*pj* arranged in 10 rows and 16 columns. However, DMD 105 may have any number of detection zones arranged in n rows×m columns, where n and m may each independently be any integer equal to or greater than 2, 3, 4 or other integer of at least 2. The array 120 includes the array of detection zones to be displayed on the camera images by the graphics, but the graphics may depict fewer detection zones than those present in the array 120. The array 120 has a horizontal angle or width of detection θh and a vertical angle or height of detection θv, and each detection zone 122*aa*-122*pj* has a horizontal angle of detection γh and a vertical angle of detection γv. The calibration subject S1 is measured relative to the center 110 of the detection zone array 120 by θh1 and θv1. The camera 101 has a horizontal angle or width of view αh and a vertical angle or height of view αv at the focal distance of the subject S1. The vector B, the parallax offset between the entrance pupil EP of the camera lens 102 and the DMD 105, is directed from the entrance pupil EP of camera lens 102 to the center of the DMD 105 image detector. The parameters εv and εn represent the vertical and horizontal angular offsets between the center of the detection zone array 120 and the center OC of the camera field of view 130 or the camera sensor 103. The optical axis OA1 of the camera 101 is parallel to the optical axis OA2 of the DMD 105.

Figure 3A:
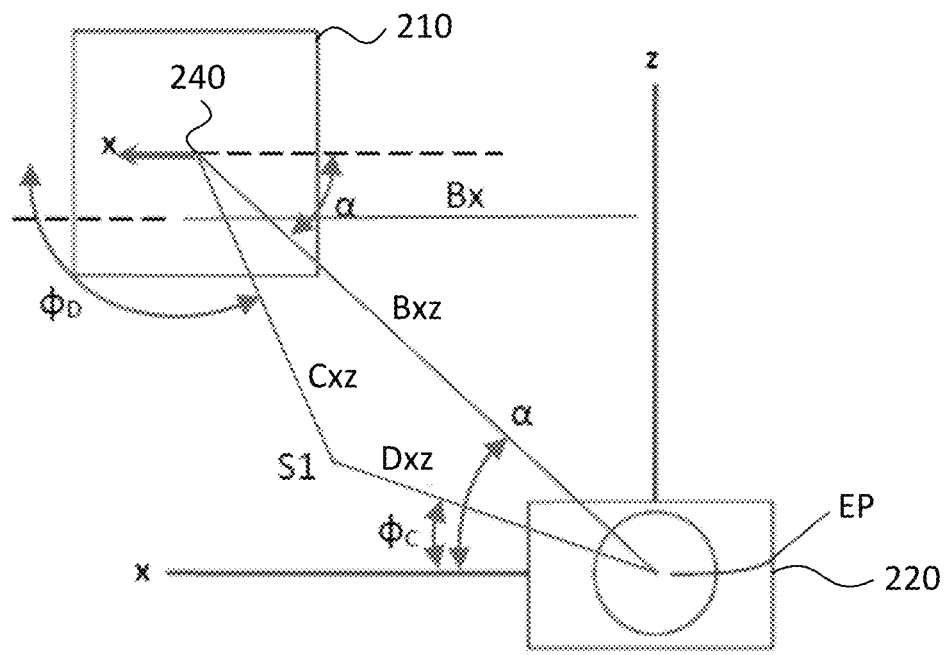
FIGS. 3A-B show graphical representations of coordinate systems for determining the distances separating the image sensor of the camera, the detector/sensor of the distance measuring device, and a subject in the field of view of the camera according to one or more embodiments of the present invention.
Figure 3B:
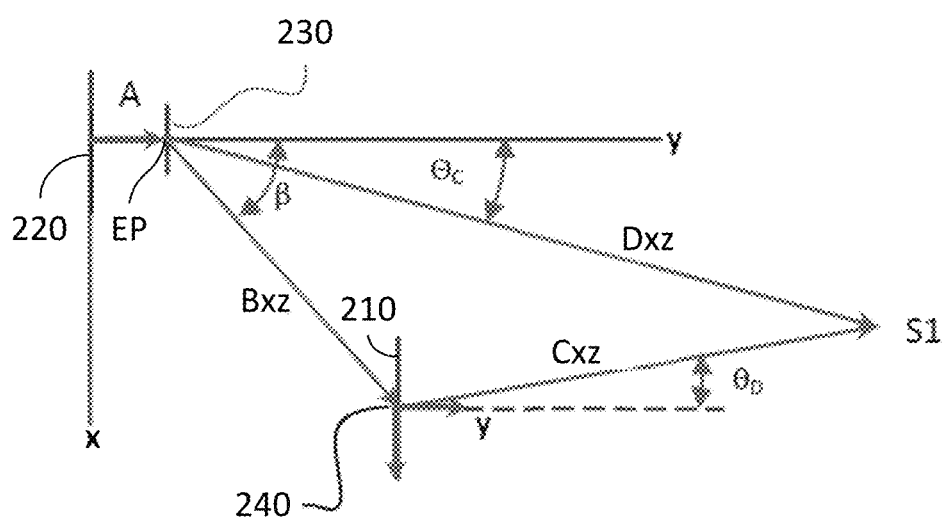

Exemplary Methods of Determining a Camera-to-Subject Distance and Correcting for the Camera-to-Distance Measuring Device Offset Referring now to FIG. 3A, the offset in the x-z plane between the center of the sensor array 210 in the DMD 105 and the center of the image sensor 220 of the camera 101 is represented by Bxz, the component of the vector B in the x-z plane. The offset Bxz results in one elevation angle $\Phi_C$ of the subject S1 as seen by the camera image sensor 220, and a different elevation angle $\Phi_D$ at the DMD 105 detector array 210. According to FIG. 3B, the offset in the x-y plane between the center of the detector array 210 in the DMD 105 and the center of the image sensor 220 of the camera 101 is represented by Bxy, the component of the vector B in the x-y plane. The offset Bxy results in an azimuth angle $\theta_C$ of the subject S1 as seen by the camera image sensor 220, and a different azimuth angle $\theta_D$ from the corresponding detector array 210 of the DMD 105.

Referring again to FIGS. 3A and 3B, the elevation and azimuth angles $\Phi_C$ and $\theta_C$ of the calibration subject S1 as seen from the center of the camera sensor 210 are related to the corresponding elevation and azimuth angles $\Phi_D$ and $\theta_D$ of the DMD detector array 220 by the following equations [2] and [3]:

$$\Phi_C = \tan^{-1}\{[Bz+|Cxz|\sin\Phi_D]/[Bx+|Cxz|\cos\Phi_D]\} \qquad [2]$$

$$\theta_C = \tan^{-1}\{[Bx-|Cxy|\sin\theta_D]/[By+|Cxy|\cos\theta_D]\} \qquad [3]$$

Figure 4:
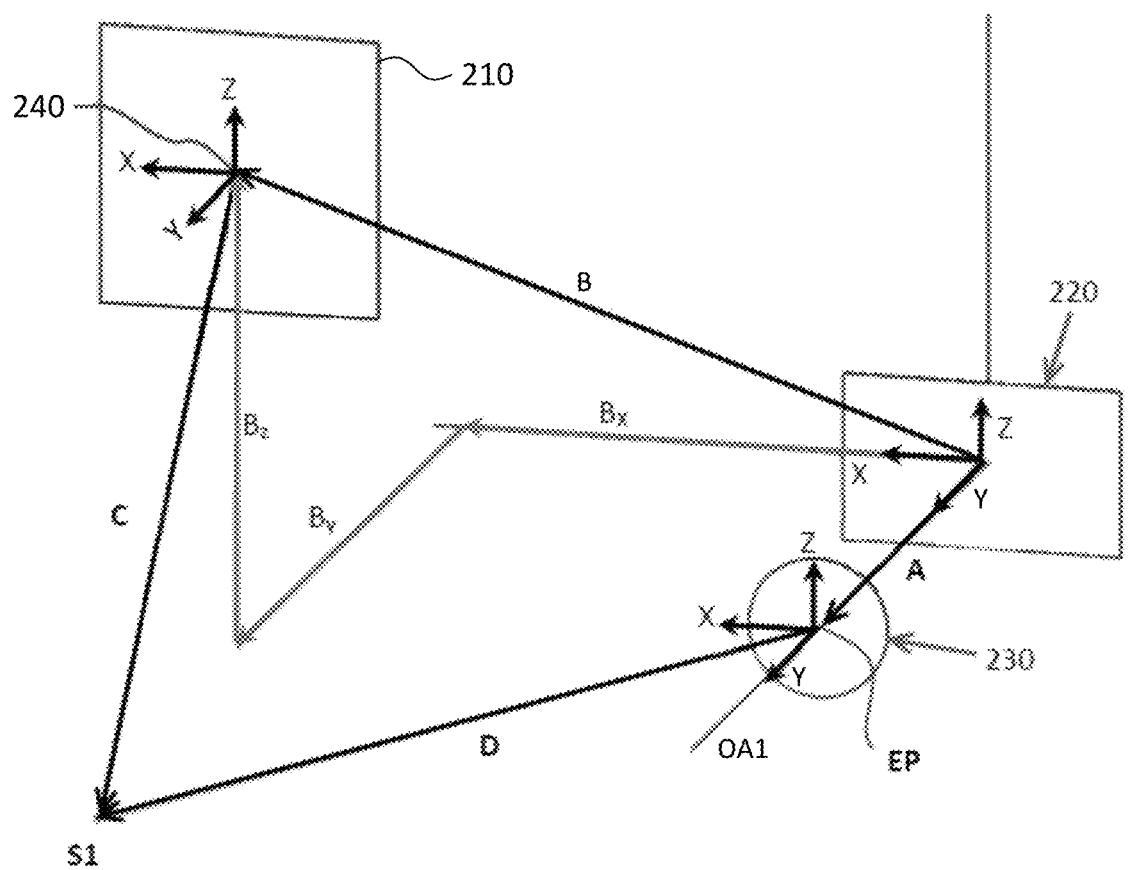
FIG. 4 is a graphical representation of a coordinate system for determining the distances separating the image sensor of the camera, the detector/sensor of the distance measuring device, the entrance pupil of the camera, and a subject in the field of view of the camera according to one or more embodiments of the present invention.
Figure 5:
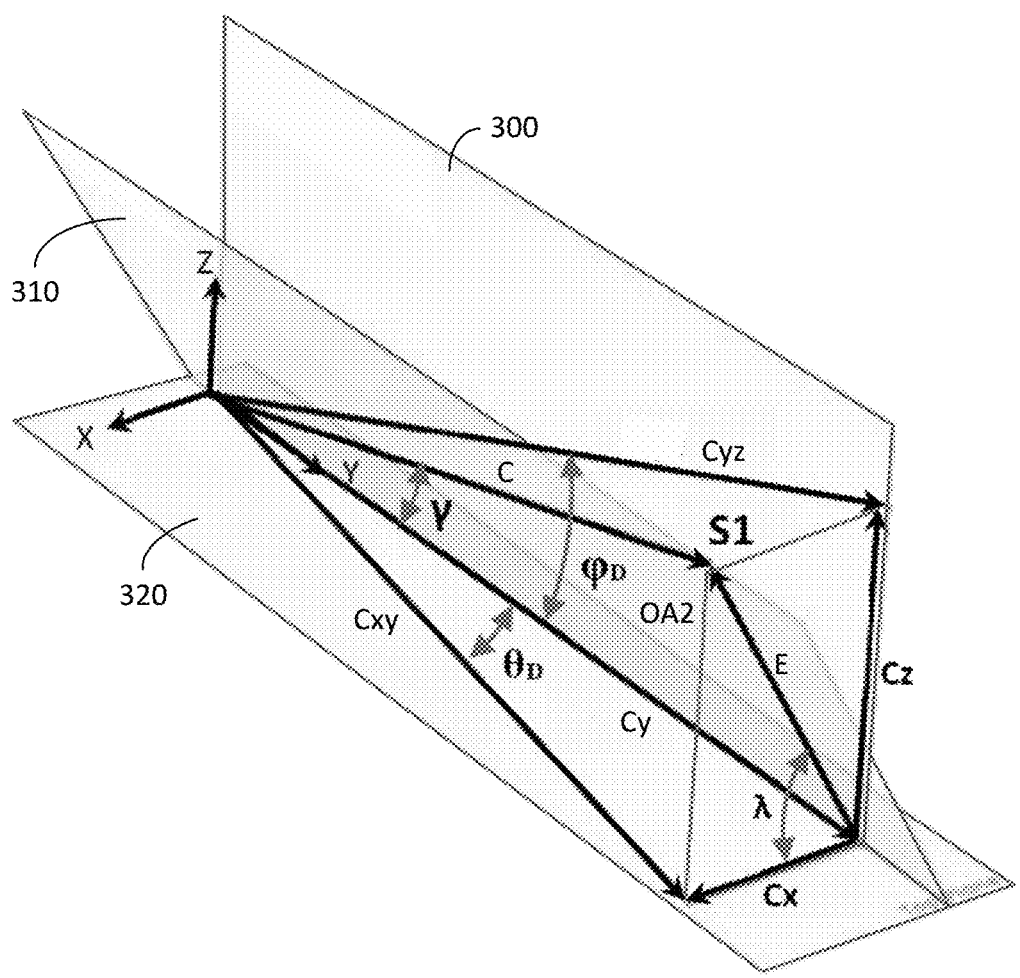
FIG. 5 is a graphical representation showing exemplary horizontal and vertical angles of detection of the distance measuring device for determining the distance of an object from a reference point according to one or more embodiments of the present invention.

FIG. 4 is a diagram showing a coordinate system for determining the distances separating the image sensor 220 of the camera, the detector/sensor array 210 of the distance measuring device, the entrance pupil EP of the camera, and the calibration subject S1. The optical axis of the detector array 210 of the DMD 105 is collinear with the Y axis extending from the center 240 of the detector array 210. The vector C is directed from the center 240 of the detector array 210 to the calibration subject S1. Referring to FIG. 5, the angle subtended by the C-y plane 310 and the x-y plane 320 is X. The vector E is perpendicular to the vector Cy and has a magnitude |C| sin γ. The angle λ subtending the C-y plane 310 and the x-y plane 300 is given by the relation [4]:

$$\lambda = \tan^{-1}(Cz/Cx) \qquad [4]$$

The ratio Cz/Cx is equal to the ratio of the detector elevation angle $\Phi_D$ to the detector azimuth angle $\theta_D$ (i.e., $\Phi_D/\theta_D$) for the detection zone of the calibration subject S1. Cz and Cx also correspond to the parameters θv1 and θh1 (FIG. 2). The expressions [5]-[7] for the components of C and the angle γ to evaluate φC and θC are:

$$|Cxz| = |C|\cos\gamma/\cos\theta_D \qquad [5]$$

$$|Czy| = |C|\cos\gamma/\cos\Phi_D \qquad [6]$$

$$\cos\gamma = \cos\Phi_D/[1+\cos^2\phi_D\tan^2\theta_D]^{1/2} \qquad [7]$$

Referring again to FIG. 5, the y-component of C is given by the expression:

$$Cy = |C|\cos\gamma \qquad [5']$$

Referring back to FIG. 4, the distance along the y-axis from the image plane 220 of the camera 101 to the subject S1 is the sum of the y-components of the vectors A and D. Also, as shown in FIG. 4, the vector sum of A+D equals the vector sum of B+C:

$$A+D=B+C \quad [1']$$

Lenses used in the cinema or motion picture arts generally have substantially flat planes of focus, and lens focus distance calibrations are generally referenced from the camera image plane (e.g., plane 220 in FIG. 4) along the camera lens optical axis OA1 (to the plane of focus). Therefore, for the calibration subject S1 detected by the detector array 210 in the DMD 105, a video overlay and processing unit (VOPU; see the discussion of FIG. 6 below) calculates the distance from the camera image plane 220 to the subject S1 (i.e., the distance A+Dy, where Dy is the y component of vector D), along the optical axis OA1 from the image plane 220 of the camera 101 to the intersection of the optical axis OA1 with the plane of focus (see, e.g., field of view 130 in FIG. 2) for the calibration subject S1. During use, the VOPU calculates the distance from the camera image plane to at least one subject or object in each detection zone along the optical axis from the image plane of the camera to the intersection of the optical axis with the plane of focus for the subject or object.

The distance A+Dy is calculated by adding or summing (1) a vector A, directed from the image plane 220 of the camera 101 (FIG. 4) to the entrance pupil EP of the lens 230, (2) a vector B, directed from the entrance pupil EP of the lens 230 to the intersection point of the DMD reference plane (e.g., the detector array 210) and the DMD optical axis OA2 (see FIG. 2; henceforth this intersection is referred to as the center of the DMD reference plane), and (3) a vector C (FIG. 4), directed from the center of the DMD reference plane 210 to the subject (e.g., S1); and calculating the component of the resultant vector that is parallel to the optical axis OA2 of the DMD 105. The vector A may lie along the optical axis OA1, in which case its component along the optical axis is |A|, its absolute value. The component of vector B along an axis parallel to axis OA1 (i.e., $B_y$) may be calculated (e.g., using Equation [9] below), measured directly or empirically, or determined by calibration.

One method for carrying out such a calibration uses a test subject or calibration subject (not shown) at a distance S, centered on the line of sight (i.e., OA1) of the camera 101. In an exemplary calibration method, a small calibration target is centered on the camera image detector 220 (e.g., along the camera optical axis OA1) and situated at a calibration distance S from the image detector 220. The calibration distance S is between one and two times the near focus distance limit of the camera lens 102. The calibration target is the closest target to the DMD 105, and as a result, the target distance S can be accurately determined or identified. The iris of the lens 102 is set to its maximum opening so that sharp focus can be accurately determined. The image of the calibration target on the detector array 210 of the DMD 105 is smaller than a single element (e.g., a photodetector) of the detector array 210, and therefore can be contained within a single detection zone. The user manually adjusts the focus of the camera lens 102 until maximum sharpness is obtained, then stores the data.

Using the stored calibration data, the video overlay and processing unit (VOPU; see FIG. 6 and the corresponding discussion below) calculates for any detected subject the elevation angle $\Phi_C$ (FIG. 3A) and azimuth angle $\theta_C$ (FIG. 3B) relative to the center of the entrance pupil EP and the elevation angle $\Phi_D$ (FIG. 3A) and azimuth angle $\theta_D$ (FIG. 3B) relative to the center 240 of the sensor array 210, all according to the values for the components of the vector B. The calibration target may be placed at the intersection of the camera lens optical axis OA1 with the subject plane, in which case the elevation and azimuth angles of the calibration subject S1 on the image sensor are both zero. The components Bx and Bz can be determined from Equations [8a] and [8b] below:

$$Bx=|Cxy| \sin \Theta_D \quad [8a]$$

$$Bz=-|Cxz| \sin \Phi_D \quad [8b]$$

Bz and Bx correspond to the vertical and horizontal angular offsets ∈v and ∈h between the center of the detection zone array 120 and the center of the camera sensor 103.

At the calibration distance, $D_y^{cal}$ (the y-component of the distance from the center of the entrance pupil EP of the lens 230 [FIG. 4] to the calibration subject S1) and $C_y^{cal}$ (the y-component of the distance from the center of the sensor array 210 of the DMD 105 to the calibration subject S1) are determined. By Equation [1'] above, the y-components $D_y^{cal}$ and $C_y^{cal}$ can be determined from the values of By and |A|:

$$By-|A|=D_y^{cal}-C_y^{cal} \quad [9]$$

From [7] and [5']:

$$C_y^{cal}=|C|^{cal} \cos \gamma^{cal} \quad [9']$$

Using the value for By −|A|, the VOPU (FIG. 6) calculates the lens distance according to Equation [10] below:

$$Dy=D_y^{cal}-C_y^{cal}+Cy \quad [10]$$

The lens focus distance Dy according to Equ. [10] above, combined with the expressions for the elevation and azimuth angles relative to the image sensor 220 of the camera 101 (Equs. [8a] and [8b]) specify which of the detection areas represented by overlay graphics on the monitor correspond to any given one of the subjects or objects detected by the DMD 105.

For the graphics overlay (see, e.g., FIGS. 1A-B) comprising a two-dimensional array of rectangles across the center of the monitor, each rectangle graphic (e.g., 32aa-dd, 42aa-hh) covers a range of elevation angles $\Theta v1 \pm \gamma v/2$ and azimuth angles $\Theta h1 \pm \gamma h/2$ (see, e.g., FIG. 2), and the VOPU (FIG. 6) correlates focus distance data from the detections zones of the DMD 105 (whose elevation and azimuth angles are determined according to Equs. [8a] and [8b]) with the elevation and azimuth angle ranges represented by each of the rectangular graphics.

An Exemplary Wireless Video Processing Unit

Figure 6:
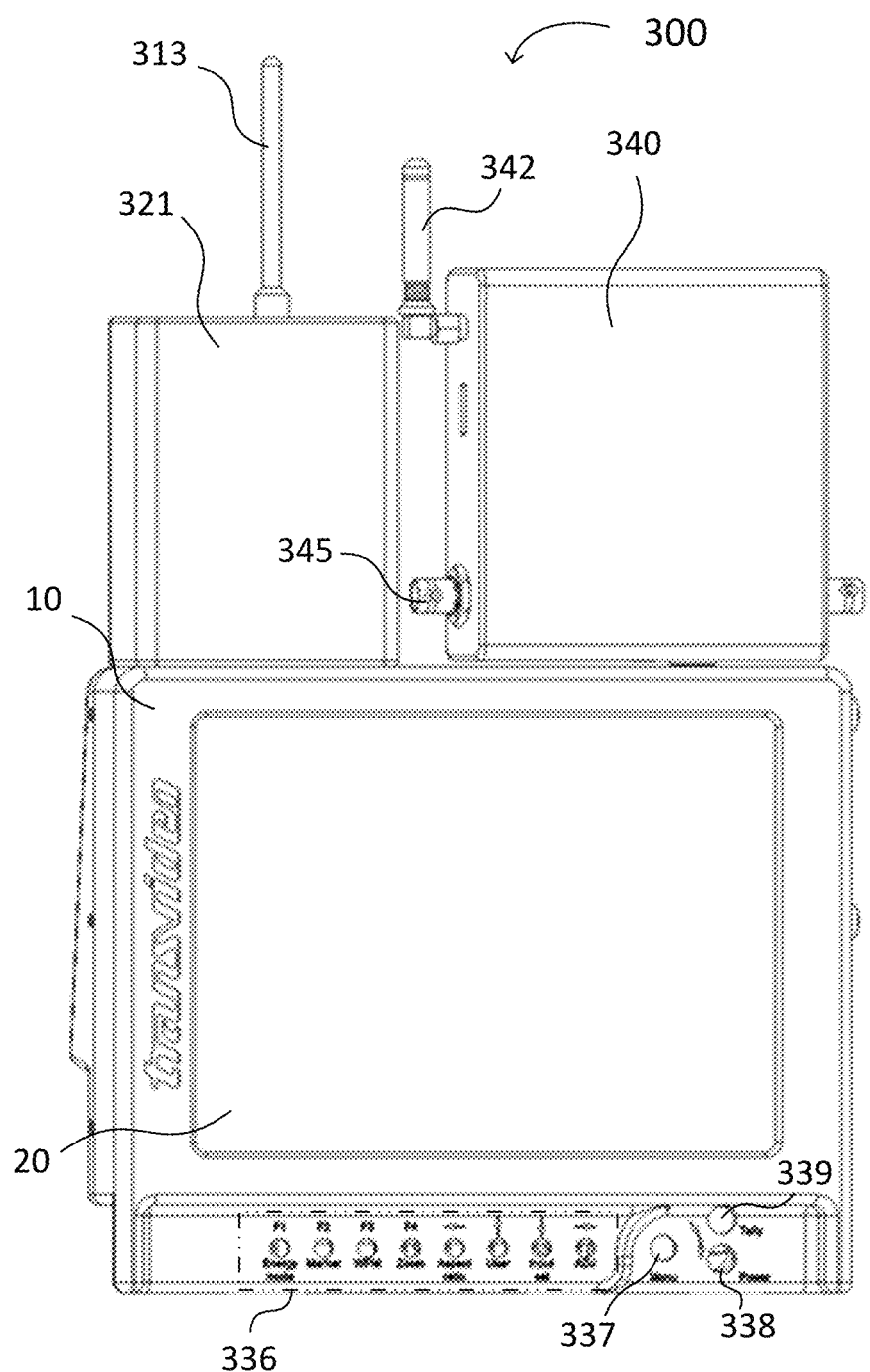
FIG. 6 shows an exemplary graphics overlay unit for a wireless video processing unit according to one or more embodiments of the present invention.

FIG. 6 shows an exemplary video processing unit 300, including a video receiver 321 equipped with an antenna 313, a graphics overlay unit 340 equipped with an antenna 342 and a connector 345 configured to receive the video signal from the video receiver 321, and a monitor 10 having a display screen 20. The monitor 10 may further comprise a control block/interface 336 (including a plurality of controls for changing or adjusting the energy mode [e.g., battery-powered operation or plugged in], marker, WFM, zoom, aspect ratio, selecting the user and/or input source, and/or making other adjustment[s]), a menu display on/off button 337, a power on/off button 338, and a tally indicator 339 that indicates whether the selected camera/input source is recording or not. In addition to displaying the video and/or image with the present graphics overlaid thereon, the monitor 10 can also display lens data in a predetermined region of the display 20 (e.g., in a separate bar at the bottom of the screen). The lens data may include one or more of the following: focus distance, the iris setting(s), the focal length of the lens, and endpoints of the depth of field range (i.e., the depth of field near distance and the depth of field far distance).

The graphics overlay unit 340 receives the video signal from the video receiver 321, and overlays or superimposes graphics including the two-dimensional array of detection zones on the video signal. For a given angle and/or field of view of the camera lens, the graphics overlay unit 340 maintains static graphic detection zone areas, independent of parallax. Over a range of focal lengths of the camera, the size of the detection zones remains substantially fixed. Consequently, as the focal length is changed or diminished, the video image does not become cluttered, and the focus puller does not have to make adjustments for changes in the detection zone sizes.

Figure 7:
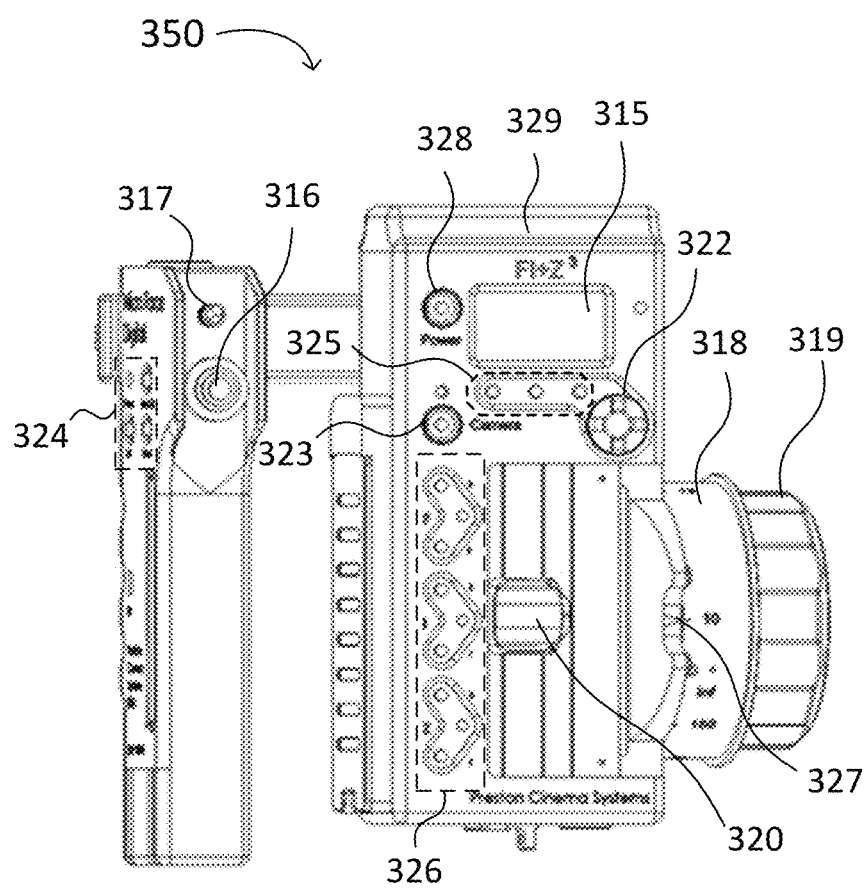
FIG. 7 shows an exemplary hand (manual) control unit for a wireless video processing unit according to one or more embodiments of the present invention.

FIG. 7 shows an exemplary hand control unit 350, including a digital display 315 for use in calibrating the camera and using the focus, iris and zoom motor controls, camera start/stop indicators 317 and 323, a control interface 324 (for calibrating the lens, such as the zoom function/settings), a zoom controller 316, a focus knob 319, an iris control slider 320, a switch 322 for selecting menu items on the display 315, soft input keys 325 for selecting certain displayed items or functions on the display 315, a ring selector 318 for selecting a focus distance, a witness mark 327 that indicates the focus distance selected using the ring selector 318, a focus knob 319, and a set of limit selection keys 326 configured to allow the user to select limits for the focus, iris and/or zoom motors (in the camera 101 in FIG. 2). The zoom controller 316 may comprise a pressure-sensitive joystick, in which the pressure applied to the joystick controls the rate or speed with which the camera changes the focus, iris and/or zoom.

The video graphics overlay and (data) processing unit VOPU 340 can be attached electrically (and optionally, mechanically) to the monitor 330. The video overlay unit 340 receives focus information from both the DMD 105 (FIG. 2) and the hand control unit 350 (FIG. 7). A beam of radiation (e.g., infrared light) from one or more emitters in the DMD 105 reflects or bounces off subjects or objects in the scene (e.g., the field of view of the camera). The angle of the radiation may be from 5° to 45° (in one example, it is about 9°, and in another example, it is about 15°), and its range can be up to about 300 meters or 1000 feet (in one example, it is about 50 meters or 150 feet). The reflected beam is captured by a detector array 210 (e.g., FIG. 3A) behind the lens of the distance measuring unit 105. In general, the detector array 210 corresponds to the array of detection zones (e.g., array 30 in FIG. 1A or array 40 in FIG. 1B) to be generated by the VOPU 340. The detector array 210 may comprise an array of image detectors integrated onto a single substrate or as discrete devices. Consequently, the present distance measuring device or unit 105 can avoid the use of narrowly collimated lasers (thereby eliminating consequent eye safety issues) and ultrasonic signals, and transponders need not be attached to the actors or other moving subjects in the field of view of the camera 101.

In various implementations, the VOPU 340 generates detection zone graphics in which two or more elements (e.g., detectors in the detector array and/or zones of the detection zone array) can be combined to form an aggregate or composite detection zone. By combining two or more elements of the detector array and/or detection zone array, the resultant aggregate or composite detection zone has a larger angle of detection. In situations where the angle of view of the camera lens is large relative to the angle of an element of the detector array and/or detection zone array, the detection zone graphics may clutter the video image and make it difficult to discern the underlying image.

In one implementation, the user may instruct the VOPU 340 (e.g., using a touch-sensitive display screen 20 on the monitor 10) to combine two or more contiguous detection zones in one or more rows and/or columns to reduce the number of detection zones. Similarly, the user may instruct the VOPU 340 to split one or more detection zones in one or more rows and/or columns to increase the number of detection zones. Typically, all of the detection zones in a given row or column (or, in one example, the entire array) will have the same combining or splitting operation performed. For example, when the user instructs the VOPU 340 to combine adjacent detection zones in one or more selected rows (or in the entire array), the VOPU 340 combines first and second adjacent detection zones, third and fourth adjacent detection zones, fifth and sixth adjacent detection zones, etc., such that all detection zones in the selected rows (or in the array) are combined with an adjacent detection zone, thereby reducing the number of detection zones in the selected rows (or in the array) by 50%.

Alternatively, when the ratio of the angle of view of the camera lens to the angle of view of a detection zone exceeds a predetermined threshold (e.g., 8, 10, 12, etc.) in a given orientation (e.g., horizontal or vertical), the VOPU 340 may automatically combine adjacent detection zones in each row and/or column to reduce the number of detection zones. For example, the number of detection zones can be reduced by ½ when the ratio of the horizontal angle of view of the camera lens to the horizontal angle of view of the detection zones exceeds the predetermined threshold, and pairs of adjacent detection zones in each row are combined. This process can be reversed when the horizontal angle of view ratio decreases below the predetermined threshold. The same approach can be applied to adjacent detection zones in each column when the ratio of the elevation angle of view of the camera lens to the elevation angle of view of the detection zones crosses a given threshold.

Referring now to FIG. 7, a motor control, data processing and communication unit (not shown) on the camera 101 positions the gears of focus, iris, and zoom motors and/or encoders in accordance with the motor position information and/or data sent by controls 316, 319 and 320. For example, the focus, iris, and zoom functions of the lens 102 (FIG. 2) are adjusted and/or controlled by a focus lens gear, a zoom lens gear, and an iris lens gear. A gear of the focus motor/encoder is coupled to the focus gear, the gear(s) of the zoom motor/encoder are coupled to the zoom gear, and a gear of the iris motor/encoder is coupled to the iris gear. Manual rotation of the focus knob 319 (FIG. 7) controls the position of the gear of focus motor/encoder, linear movement or motion of the iris knob 320 controls the position of the gear of the iris motor/encoder, and pressure on the zoom control knob 316 controls the position of the gear of the zoom motor/encoder. The focus, iris, and zoom settings of the lens 102 (FIG. 2) may be referred to herein as lens settings. The lens settings are transmitted by user hand control unit 350 (FIG. 7) via a wireless link (e.g., including antenna 329) to the motor control, data processing and communication unit in the form of serial digital data. The lens settings may also be sent directly to the motor control, data processing and communication unit by lenses that provide their lens data through an electrical interface (not shown). The motor control, data processing and communication unit receives distance data from distance measuring device 105 (FIG. 2) and transmits both the distance data and the current focus distance setting that the motor control, data processing and communication unit receives from the hand control unit 350 (FIG. 7) to the video overlay and processing unit 340.

An Exemplary Method

The present invention further relates to method of focusing a cine-camera, comprising simultaneously or substantially simultaneously determining a distance from a distance measuring device to one or more subjects and/or objects in each of a two-dimensional array of detection zones of the distance measuring device, generating graphics indicating (i) a field of detection and a position for each of the detection zones and (ii) one or more focus settings for subject(s) and/or object(s) detected in each detection zone in a video or motion picture, indicating in the graphics focus changes, adjustments or corrections to a lens of the cine-camera that will bring the subject(s) and/or object(s) in detection zones that are out of the depth of field of the cine-camera into focus, and displaying the video or motion picture on a display with the graphics overlaid or superimposed on the displayed video or image. The distance from the distance measuring device or other reference point to the subject(s) and/or object(s) may be determined or measured by each of a two-dimensional array of detector elements (e.g., photodiodes) in the distance measuring device.

In further embodiments, the graphics further indicate a detection zone in which one or more subjects or objects are within the depth of field of the cine-camera; the cine-camera is a motion picture camera, and the video or motion picture is a motion picture; the distance(s) of the subject(s) or object(s) in each detection zone is determined by irradiating the subject(s) or object(s) in a field of view of the camera with radiation, detecting the radiation reflected from the subject(s) or object(s), and calculating the distance(s) from the reflected radiation; and/or the method further comprises changing or adjusting the focus of the lens to bring the subject(s) and/or object(s) in one or more detection zones that are out of the depth of field of the camera into focus.

FIG. 8A is a flow chart 400 showing an exemplary method 400 of focusing a camera. In one embodiment, the camera is a motion picture camera, and the method focuses the camera on one or more subjects or objects in a two-dimensional array of detection zones in a video or motion picture. The flow chart 400 is generally applicable to the manual focus mode for focusing a cine-camera, as described herein.

In a first step, one or more subject(s) and/or object(s) in a field of view of the camera are irradiated with a radiation beam from a distance measuring device at 410, and the radiation reflected from the subject(s) and/or object(s) is detected by the distance measuring device, as described herein. For example, to minimize (i) the risk of damage or injury to the subject(s) and/or object(s) and (ii) the potential disruption to filming or recording the video, the radiation may consist of infrared (IR) light (e.g., incoherent non-laser IR light). Prior to irradiating the subject(s) and/or object(s) and detecting the reflected radiation, the distance measuring device may be attached to the camera, above and/or adjacent to the camera lens. The emitter of the distance measuring device is aimed in the same direction as the optical axis of the lens. In various embodiments, the distance measuring device may incorporate a mounting device that allows for an adjustable separation distance from the camera lens, while maintaining parallelism between the optical axis of the camera lens and the receiving/optical axis of the distance measuring device. Power (e.g., 10-30 V DC from a battery or an AC-DC converter) may be supplied to the distance measuring device through a power port (e.g., a 2-pin power connector). In one embodiment, the distance measuring device can transmit and receive electrical signals to and from a motor control, data processing and communication unit of the camera through a serial port and/or connection (e.g., a USB cable or wire) on each device/unit.

At 420, the distance(s) of the subject(s) and/or object(s) in each of the detection zones are simultaneously or substantially simultaneously calculated from a reference point (e.g., the center of the detector array in the distance measuring device, the center of the image sensor in the camera, etc.) using the reflected radiation, in a manner known to those skilled in the art and calculated and/or corrected as explained above. Optionally, the distance(s) of the subject(s) and/or object(s) from the reference point are calculated using characteristics (e.g., the wavelength[s], intensity, etc.) of the radiation beam or from information modulated thereon.

At 430, graphics are generated that indicate (i) a field of detection and a position for each of the detection zones and (ii) one or more focus settings for subject(s) and/or object(s) detected in each detection zone in video or motion picture images from the camera. The graphics also indicate at 440 the focus changes to the camera lens that will bring the subject(s) and/or object(s) in detection zones that are out of the depth of field of the camera into focus. In many embodiments, the graphics also indicate all of the detection zones in which one or more subjects or objects are within the depth of field of the camera (e.g., that are in focus) at 445. Lens setting data, in the form of overlaid text accompanying the graphics, can indicate in addition to the lens setting(s) the near and far limits of the depth of field.

Prior to generating the graphics, the graphics overlay unit can be attached to the back of, or connected inline with, a viewing monitor. Generally, there are at least three connections to the graphics overlay unit: power, video input and video output. Each of the video input and video output may comprise an HD-SDI or HDMI standard connection, and be carried over a BNC cable, among others. Parallax correction of the position of the distance measuring device relative to the camera lens can be determined, calculated and/or controlled (e.g., as described herein) using a graphics overlay menu (e.g., commands and inputs displayed, entered and/or selected on the monitor).

At 450, the video or motion picture images are displayed on a display (e.g., a monitor or viewing screen), and the graphics are overlaid or superimposed on the displayed video or image. The graphics may comprise a two-dimensional array of detection zones (e.g., zones 32*aa*-32*dd* in FIG. 1A or zones 42*aa*-42*hh* in FIG. 1B). The size and position of each detection zone does not change for a fixed angle of view or focal length of the camera lens, regardless of the focus settings of the camera or the parallax when focusing on a subject or object that is relatively close to the camera lens. The graphics indicate (i) a field of detection and a position for each of the detection zones, (ii) one or more focus settings for the subject(s) and/or object(s) in the video or motion picture that are detected in each detection zone, and (iii) the focus changes or adjustments (and optionally, the iris and/or zoom changes or adjustments) to the camera lens that will bring into focus those subject(s) and/or object(s) in detection zones that are out of the depth of field of the camera. The graphics may also indicate those detection zones, if any, in which one or more subjects or objects are within the depth of field of the camera (e.g., that are in focus). The detection zones may have a fixed angle of detection, in which case their number and position may change in accordance with the angle of view of the camera. Furthermore, adjacent elements (e.g., zones) in the detection zone array may be combined to form a larger (e.g., composite or aggregate) detection zone, and/or detection zones in one or more rows and/or columns (or in the entire array) may be split to form smaller detection zones.

At 460, it is determined whether to change focus to a different subject or object. If not, the method 400 continues to irradiate the subject(s) and/or object(s) in the field of view with the radiation beam, detect the radiation reflected from the subject(s) and/or object(s), and calculate the distance(s) of the subject(s) and/or object(s) in each of the detection zones from the reference point at 410 and 420. If so, the detection zone including the different subject or object is selected at 470, then the focus (and optionally, the iris and/or zoom) settings or position of the lens is/are changed or adjusted to bring the subject(s) and/or object(s) in the selected detection zone into focus at 410-430. Because filming and/or video recording is a continuous process, the subject(s) and/or object(s) in the field of view of the camera are continuously irradiated, the reflected radiation is continuously detected, and the distance(s) of the subject(s) and/or object(s) in each of the detection zones from the distance measuring device or other reference point are continuously calculated, as described herein. In addition, any changes in the focus settings needed to bring into focus subjects and/or objects that are not in focus may be continuously updated in the graphics, or may be updated upon request (e.g., by pressing a "Focus Update" button or icon).

At 480, the user determines whether or not to change the camera focusing system from manual focus mode to autofocus mode. If not (i.e., continue in manual focus mode), the method 400 continues to irradiate the subject(s) and/or object(s) in the field of view with the radiation beam, detect the radiation reflected from the subject(s) and/or object(s), calculate the distance(s) of the subject(s) and/or object(s) in each of the detection zones from the reference point, and generate the graphics indicating the field of detection and position for each of the two-dimensional array of detection zones and the focus setting(s) for the subject(s) and/or object(s) in each detection zone at 410-430. If so, the user may switch the camera focusing system from manual focus mode to autofocus mode as described herein.

FIG. 8B is a flow chart 500 showing an exemplary method 400 of autofocusing a cine-camera. For example, at 510, graphics are generated that indicate the field of detection and position for the autofocus detection zone. As described herein, the field of detection and position for the autofocus detection zone may correspond to one or more detection zones in the two-dimensional array of detection zones.

At 520, one or more subject(s) and/or object(s) in the autofocus detection zone are irradiated with a radiation beam from the distance measuring device, and the radiation reflected from the subject(s) and/or object(s) is detected by the distance measuring device, as described herein. In some embodiments, the cine-camera focusing system may automatically focus on the closest subject or object in the autofocus detection zone, as an initial or default condition. At 530, the distance(s) of the subject(s) and/or object(s) in the autofocus detection zone is/are simultaneously or substantially simultaneously calculated from a reference point using the reflected radiation, as described herein. At 540, additional graphics may be generated that indicate one or more focus settings for subject(s) and/or object(s) detected in the autofocus detection zone that are out of the depth of field of the camera (i.e., that are not in focus). Alternatively, the graphics may indicate the distance that such subject(s) and/or object(s) are from the reference point (e.g., the entrance pupil of the camera lens) or the focus changes that will bring the subject(s) and/or object(s) in detection zones that are out of focus into focus.

At 550, the graphics are overlaid or superimposed on the video or motion picture images, and at 560, the video or motion picture images with the graphics are overlaid or superimposed thereon are displayed on the display. The graphics may further comprise the two-dimensional array of detection zones, but with a faded color, narrower boundary lines, dashed lines, or other indicator that the two-dimensional array of detection zones (which is active in the manual focus mode) is inactive (see, e.g., FIG. 9A and the discussion thereof). At 570, the user may select a particular subject or object on which the cine-camera focusing system will automatically focus the cine-camera, assuming the initial or default subject or object (if any) is not the desired subject or object for autofocusing. At or after 560-570, the size and/or position of the autofocus detection zone may be changed by the user, either directly on the display (if the display include a touch-sensitive screen) or using one or more control buttons, keys and/or commands (e.g., in an interactive menu displayed on the same or different display).

At 580, the user may determine whether to change focus to a different subject or object in the autofocus detection zone. For example, if the display includes a touch-sensitive screen, the user can simply touch or tap the different subject or object of the display to select the different subject or object for autofocusing. If the user does not wish to change focus to a different subject or object, the method 500 continues to irradiate the subject(s) and/or object(s) in the autofocus detection zone with the radiation beam, detect the radiation reflected from the subject(s) and/or object(s), calculate the distance(s) of the subject(s) and/or object(s) in each of the detection zones from the reference point, and automatically focus the camera on the same subject or object in the autofocus detection zone at 510-530. If the user wishes to change focus to a different subject or object, a different subject or object in the autofocus detection zone is selected at 580. The different subject or object may be selected directly if it is in the autofocus detection zone. In examples where the display includes a touch-sensitive screen, the user can simply touch or tap the different subject or object of the display to select the different subject or object for autofocusing. If the different subject or object is outside the active autofocus detection zone, the size and/or location of the autofocus detection zone may be changed to include or encompass the different subject or object prior to selecting the new (different) subject or object. The camera focusing system then automatically focuses the camera on the new/different subject or object.

At 590, the user may determine whether or not to change the camera focusing system from manual focus mode to autofocus mode. If not (i.e., continue in autofocus mode), the method 500 continues to irradiate the subject(s) and/or object(s) in at least the autofocus detection zone (and, more generally, at least the entire field of view of the cine-camera) with the radiation beam, detect the radiation reflected from the subject(s) and/or object(s), calculate the distance(s) of the subject(s) and/or object(s) in the autofocus detection zone, generate the graphics and automatically focus the camera on the selected subject or object in the autofocus detection zone at 510-540. If so, the user may switch the camera focusing system from autofocus mode to manual focus mode (FIG. 8A) as described herein.

Exemplary Software

The present disclosure also includes algorithms, computer program(s), computer-readable media and/or software, implementable and/or executable in a general purpose computer or workstation equipped with a conventional digital signal processor, and configured to perform one or more of the methods and/or one or more operations of the hardware disclosed herein. Thus, a further aspect of the invention relates to algorithms and/or software that create or generate graphics that indicate a focus state for one or more subjects and/or objects in each of a two-dimensional array of detection zones of a distance measuring device, and/or that implement part or all of any method disclosed herein. For example, the computer program or computer-readable medium generally contains a set of instructions which, when executed by an appropriate processing device (e.g., a signal processing device, such as a microcontroller, microprocessor or DSP device), is configured to perform the above-described method(s), operation(s), and/or algorithm(s).

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Thus, an aspect of the present invention relates to a non-transitory computer-readable medium, comprising a set of instructions encoded thereon adapted to generate graphics that assist in focusing a cine-camera. The graphics indicate a field of detection and a position for each of a two-dimensional array of detection zones of a distance measuring device. The field of detection and the position for each of the detection zones corresponds to a unique range of elevation angles and a unique range of azimuth angles from a predetermined reference point (e.g., the center of the detector array in the distance measuring device, the image sensor in the camera, or the entrance pupil of the camera lens). The graphics also indicate one or more focus settings for subject(s) and/or object(s) detected in each detection zone in a video or motion picture, and focus changes, adjustments or corrections to the camera lens that will bring the subject(s) and/or object(s) in detection zones that are out of the depth of field of the camera into focus. The set of instructions further includes instructions adapted to overlay or superimpose the graphics on a displayed video or motion picture from the camera.

The detection zones shown by the graphics that are, in turn, generated by the software generally comprise a two-dimensional array of detection zones, as described herein. Using the known distance data and the focal length of the camera lens, the present software can simultaneously or substantially simultaneously determine the focus, iris, and zoom setting changes that will bring the subject(s) and/or object(s) in detection zones that are out of focus into sharp focus, and overlay graphics indicating the direction and magnitude of such setting changes onto the video or motion picture images. The present software can also add lens setting data as overlaid text accompanying the graphics. Such text can also indicate the near and far limits of the depth of field.

In various embodiments, the predetermined reference point is the entrance pupil of the focusing lens of the camera, and the set of instructions may further include one or more instructions adapted to (i) determine an elevation angle and an azimuth angle for at least one of the subject(s) and object(s) in each of the detection zones and (ii) calculate the distances along an optical axis of the camera from the image plane to the subject(s) and/or object(s) in each of the detection zones. In other or further embodiments, the set of instructions is further adapted to replace the graphics indicating the position(s) of the detection zones with a graphic indicating an auto-focus detection zone, and to automatically focus the camera on a selected subject or object in the auto-focus detection zone. The auto-focus detection zone has a position corresponding to one or more of the detection zones. The position of the auto-focus detection zone and the particular detection zones it includes may be selected by the focus puller through the multi-function key 322 of the hand control 350 (FIG. 7). Alternatively, when the video monitor 10 (FIG. 6) comprises a touch-sensitive display screen 20, the position and size of the auto-focus zone may be controlled through the display screen 20.

Figure 9A:
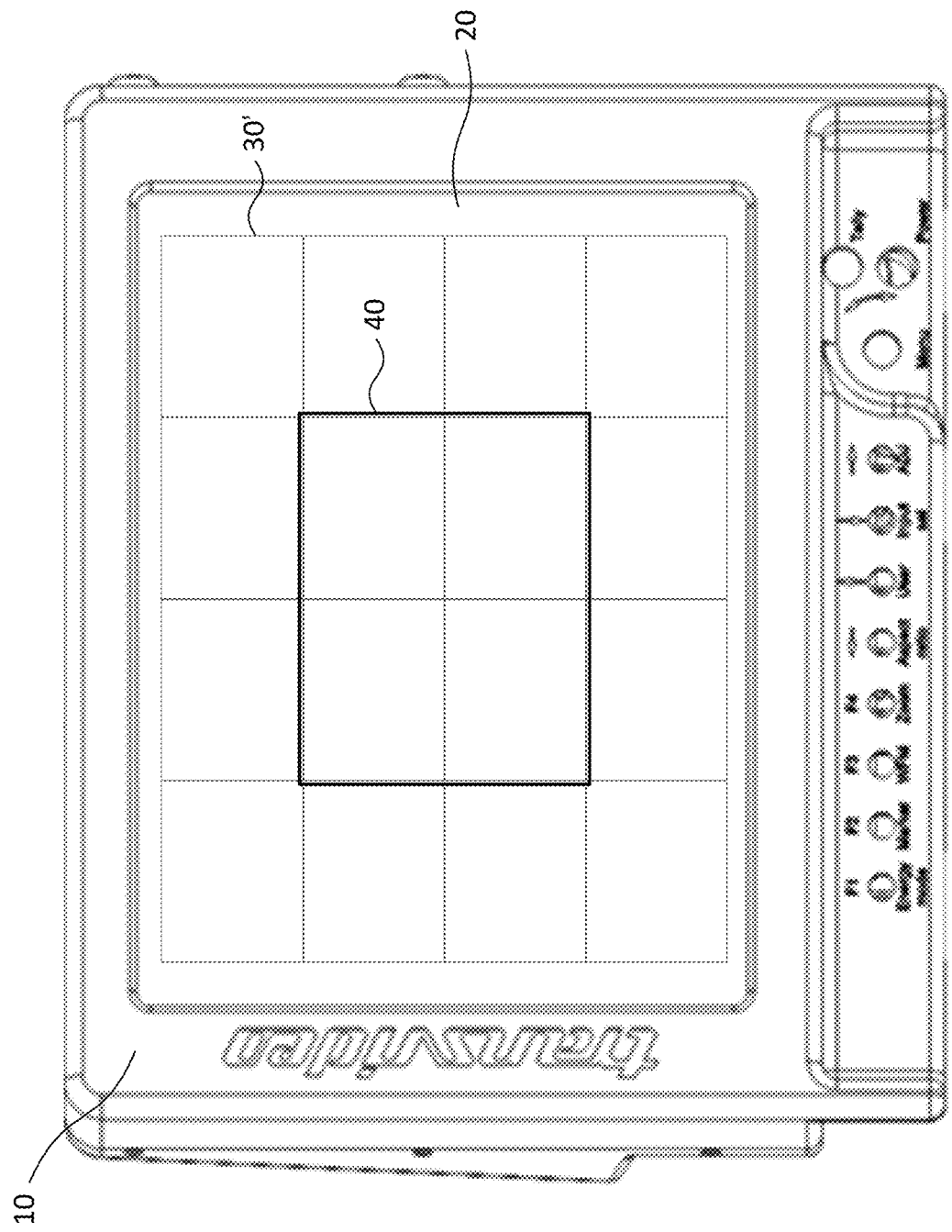

In a further embodiment, the graphics overlay software/instructions may combine information from the manual mode and the autofocus mode, and generalize and/or include both the detection zone array and the autofocus zone overlays. For example, FIG. 9A shows the exemplary monitor 10 having a display screen 20 depicting an active auto-focus zone 40 superimposed on an exemplary inactive detection zone array 30'. In the example of FIG. 9A, the cine-camera focusing system is in auto-focus mode, and the cine-camera focusing system automatically focuses on a selected subject or object in the auto-focus zone 40. The exemplary auto-focus zone 40 is emphasized relative to the detection zone array 30' by its border lines being darker and thicker than those of the detection zones in the inactive detection zone array 30', although other mechanisms for emphasis may be applied (e.g., different colors, darkness alone, thickness alone, solid lines vs. dashed or dotted lines, etc.). Also, the active auto-focus zone 40 is emphasized by its superposition over the inactive detection zone array 30' Such a mechanism of emphasis may be more clearly indicated by s distinctive contrast in colors, line thicknesses or shapes, etc.

FIG. 9B shows an active detection zone array 30 superimposed on an inactive auto-focus zone 40'. In the example of FIG. 9B, the cine-camera focusing system is in manual focus mode and provides lens setting information in each of detection zones within the array 30 that will bring one or more subjects or objects in the zone into focus. The detection zones in the array 30 are emphasized relative to the auto-focus detection zone 40' by its border lines being darker and thicker than those of the inactive auto-focus detection zone 40', although other mechanisms for emphasis may be applied. For example, the active auto-focus zone 40 is superimposed over the inactive detection zone array 30'. Thus, the user can easily distinguish between the active detection zone array 30 and the inactive auto-focus detection zone 40'.

The composite overlay arrangement depicted in FIGS. 9A-B allows the user (e.g., a focus puller) to adjust and/or set the focus control (e.g., the focus knob 319 in FIG. 7) while in auto-focus mode to match the auto-focus lens setting. By matching the focus control setting to the auto-focus setting, the focus motor maintains sharp focus on one or more particular subjects and/or objects when switching from auto-focus mode (FIG. 9A) to manual focus mode (FIG. 9B). More generally, when changing from auto-focus mode to manual focus mode, the focus control can be preset to focus on a selected subject or object in any detection zone in the two-dimensional array 30'. In addition, the composite overlay arrangement depicted in FIGS. 9A-B may also be applied to a one-dimensional (e.g., horizontal row) array of detection zones.

CONCLUSION/SUMMARY

Thus, the present invention provides methods, apparatuses, systems and software for focusing a cine-camera. The cine-camera focusing system generally comprises (a) a distance measuring device, (b) a video receiver configured to receive video and/or images from the cine-camera, (c) a graphics overlay unit, and (d) a monitor. The distance measuring device comprises an emitter configured to emit a beam of radiation, a detector configured to detect one or more reflections of the beam of radiation, and logic configured to determine and process distance information for one or more subjects or objects in each of a two-dimensional array of detection zones in a field of view of the camera from the reflections. The detector may therefore comprise a two-dimensional array of photodetectors, or a photodetector having a two-dimensional array of detection regions corresponding to the array of detection zones. The graphics overlay unit receives (i) video and/or motion picture information from the video receiver and (ii) the distance information from the distance measuring device or other reference point, and comprises a video overlay and data processing unit configured to generate graphics indicating (1) a field of detection and position for each of the plurality of detection zones and (2) a direction and/or magnitude of a change or correction in focus setting(s) for the subjects or objects within each detection zone not within a depth of field of the camera (e.g., to bring a subject or object into focus). The monitor displays the video and/or images from the camera and the graphics overlaid or superimposed on the displayed video and/or motion picture.

The cine-camera system generally comprises the present cine-camera focusing system, a cine-camera with a lens and a video transmitter unit that transmits a video or motion picture signal output, a motor control and data processing unit configured to (i) adjust focus, iris, and zoom settings of the cine-camera and (ii) transmit lens setting data to the video overlay and data processing unit, a video receiver configured to receive the video or image signal output, and a display device configured to display the video or motion picture and the graphics overlaid or superimposed thereon. The method of focusing generally uses the present cine-camera focusing system to focus the cine-camera, and comprises simultaneously or substantially simultaneously determining a distance from a distance measuring device to one or more subjects and/or objects in each of a two-dimensional array of detection zones of the distance measuring device; generating graphics indicating (i) a field of detection and a position for each of the detection zones and (ii) one or more focus settings for subject(s) and/or object(s) detected in each detection zone in video or motion picture images from the cine-camera; indicating in the graphics focus changes, adjustments or corrections to a lens of the cine-camera that will bring the subject(s) and/or object(s) in detection zones that are out of the depth of field of the cine-camera into focus; and displaying the video or motion picture on a display, the graphics being overlaid or superimposed on the displayed video or motion picture. The software creates graphics that are useful in the present method and cine-camera focusing system. The graphics indicate (i) the field of detection and position for each of a two-dimensional array of detection zones of the distance measuring device, (ii) one or more focus settings for one or more subject(s) and/or object(s) detected in each detection zone, (iii) focus changes, adjustments or corrections to the camera lens that will bring the subject(s) and/or object(s) in detection zones that are out of the depth of field of the camera into focus, and (iv) any detection zone in which one or more subjects or objects are within the depth of field of the camera. The software also overlays or superimposes the graphics on video or motion picture images from the cine-camera displayed on a screen or monitor.

The present invention overcomes disadvantages of focusing devices and systems in which the detection zones are based on Cartesian coordinates by providing detection zone graphics that remain fixed in location and size, even as the distance between the subject(s) and/or object(s) and the image plane of the camera changes. The overlay graphics displayed on the video monitor remain static, despite varying amounts of parallax due to the separation between the distance measuring device and the image plane of the camera, and despite the different distances between various subjects and/or objects in the field of view and the camera image plane. An additional advantage of the present focusing system and method(s) is that the user avoids losing focus distance information from the monitor images resulting from parallax. Thus, the present invention allows the overlay graphics (including the two-dimensional array of detection zones) to remain static for a wide range of focal lengths of the camera lens. Thus, the present invention enables motion picture and video photography professionals and enthusiasts to maintain continuously sharp images without distraction while people and things move around in real life or in the motion picture/video.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A focusing system for a cine-camera, comprising:
   a) a distance measuring device, comprising:
      i) an emitter configured to emit a beam of radiation,
      ii) a detector configured to detect one or more reflections of the beam of radiation, and
      iii) logic configured to determine distance information for one or more subjects or objects in each of a two-dimensional array of detection zones in a field of view of the cine-camera from the reflections;
   b) a graphics overlay unit configured to receive video or motion picture information from the cine-camera and the distance information from the distance measuring device, the graphics overlay unit comprising a video overlay and processing unit configured to generate graphics indicating (1) a field of detection and position for each of the detection zones and (2) a direction and a magnitude of a change in focus setting(s) for the subject(s) or object(s) within each detection zone not within a depth of field of the cine-camera, wherein the field of detection and the position for each of the detection zones is defined by a unique set of elevation angular coordinates and azimuth angular coordinates relative to a predetermined reference point such that the field of detection and the position of each detection zone remains fixed for a fixed field of view of the camera, each unique set of elevation angular coordinates and azimuth angular coordinates includes a range of elevation angles and a range of azimuth angles, and no two detection zones overlap except at most at an endpoint of the ranges of elevation angles and azimuth angles; and c) a monitor configured to display video or a motion picture from the cine-camera and the graphics overlaid on the displayed video or motion picture.

2. The focusing system of claim 1, wherein the two-dimensional array of detection zones comprises a plurality of horizontal rows and a plurality of vertical columns.

3. The focusing system of claim 1, wherein the predetermined reference point is an entrance pupil of a focusing lens of the cine-camera.

4. The focusing system of claim 1, wherein the graphics indicate each detection zone containing the subject(s) or object(s) within the depth of field of the cine-camera.

5. The focusing system of claim 1, wherein the graphics indicate the direction and the magnitude of the change in the focus setting(s) that will achieve sharp focus on at least one of the one or more subjects or objects in a selected detection zone.

6. The focusing system of claim 5, wherein the graphics indicate a relative position of the subject(s) or object(s) within the depth of field of the cine-camera.

7. The focusing system of claim 1, wherein the graphics overlay unit further comprises a communication unit configured to receive information from a motor control, data processing, and/or communication unit on the cine-camera that adjusts the focus, iris, and/or zoom settings and transmits lens setting data for the cine-camera.

8. The focusing system of claim 1, wherein the graphics further indicate a lens focal length, a T-stop setting, a camera type, a near depth of field distance, a far depth of field distance, and/or one or more image plane-to-subject distance measurements.

9. The focusing system of claim 1, further comprising a zoom controller, a focus knob, and an iris control slider configured to control or adjust a zoom, focus or iris setting or parameter of the cine-camera.

10. The focusing system of claim 9, wherein the zoom controller comprises a joystick that controls the rate or speed with which the camera changes the focus, iris and/or zoom setting or parameter.

11. The focusing system of claim 1, further comprising a hand control unit including a display that displays menu items for calibrating the cine-camera and/or controlling focus, iris and/or zoom motors of the cine-camera, and a switch for selecting the menu items on the display and/or one or more input keys for selecting displayed items or functions on the display.

12. The focusing system of claim 11, wherein the hand control unit comprises a joystick configured to select one or more of the detection zones.

13. The focusing system of claim 11, further comprising a ring selector for selecting a focus distance, a witness mark that indicates the focus distance selected using the ring selector, and a focus knob.

14. The focusing system of claim 1, wherein the distance measuring device further comprises circuitry configured to determine and process distance information for one of the one or more subjects or objects in a selected one or more of the detection zones, the graphics overlay unit is further configured to indicate a field of detection and a position of an auto-focus detection zone, the position of the auto-focus detection zone corresponding to the selected one or more of the detection zones, and the cine-camera is configured to automatically focus on the one subject or object in the auto-focus detection zone.

15. A cine-camera system, comprising:
a) the cine-camera focusing system of claim 1;
b) the cine-camera, with a lens and a video transmitter unit that transmits a video or motion picture signal;
c) a motor control unit configured to (i) adjust focus, iris, and/or zoom settings of the cine-camera and (ii) transmit lens setting data to the video overlay and processing unit;
d) a video receiver configured to receive the video or motion picture signal; and
e) a display device configured to display the video or motion picture of the video or motion picture signal and the graphics overlaid on the video.

16. The cine-camera system of claim 15, further comprising a data processor configured to (i) determine an elevation angle and an azimuth angle for at least one of the subject(s) and object(s) in each of the detection zones and (ii) calculate the distances along an optical axis of the cine-camera from the image plane to the at least one subject and/or object in each of the detection zones.

17. A non-transitory computer-readable medium, comprising a set of instructions encoded thereon adapted to:
a) generate graphics that assist in focusing a cine-camera, the graphics indicating:
i) a field of detection and a position for each of a two-dimensional array of detection zones of a distance measuring device, wherein the field of detection and the position for each of the detection zones is defined by a unique set of elevation angular coordinates and azimuth angular coordinates relative to a predetermined reference point such that the field of detection and the position of each detection zone remains fixed for a fixed field of view of the camera, each unique set of elevation angular coordinates and azimuth angular coordinates includes a range of elevation angles and a range of azimuth angles, and no two detection zones overlap except at most at an endpoint of the ranges of elevation angles and azimuth angles,
ii) one or more focus settings for subject(s) and/or object(s) detected in each detection zone in a video or motion picture, and
iii) focus changes, adjustments or corrections to a lens of the cine-camera that will bring the subject(s) and/or object(s) in detection zones that are out of the depth of field of the cine-camera into focus; and
b) overlay or superimpose the graphics on a displayed video from the cine-camera.

18. The computer-readable medium of claim 17, wherein the predetermined reference point is an entrance pupil of a focusing lens of the cine-camera.

19. The computer-readable medium of claim 17, the set of instructions being further adapted to replace the graphics indicating the position(s) of the detection zones with a graphic indicating an auto-focus detection zone, the auto-focus detection zone having a position corresponding to one or more of the detection zones, and to automatically focus the cine-camera on a selected subject or object in the auto-focus detection zone.

20. The computer-readable medium of claim 17, further comprising one or more instructions encoded thereon adapted to (i) determine an elevation angle and an azimuth angle for at least one of the subject(s) and object(s) in each of the detection zones and (ii) calculate the distances along an optical axis of the cine-camera from the image plane to the at least one subject and/or object in each of the detection zones from the elevation angle and the azimuth angle for the at least one subject/object.

* * * * *